United States Patent [19]
Robson

[11] Patent Number: 4,967,915
[45] Date of Patent: Nov. 6, 1990

[54] STORAGE RACK AND THE LIKE

[75] Inventor: Jerry A. Robson, Mansfield, Ohio

[73] Assignee: Witty Inventions, Inc., Mansfield, Ohio

[21] Appl. No.: 369,703

[22] Filed: Jun. 21, 1989

Related U.S. Application Data

[63] Continuation-in-part of Ser. No. 195,951, May 19, 1988, Pat. No. 4,867,318.

[51] Int. Cl.$^5$ .................. A47F 5/13; A47B 65/00
[52] U.S. Cl. ..................... 211/41; 211/184; 211/89
[58] Field of Search ............ 211/42, 43, 88, 89, 211/184, 41; 248/126, 456, 465

[56] References Cited

U.S. PATENT DOCUMENTS

| | | | |
|---|---|---|---|
| 462,123 | 1/1891 | Friede | 211/88 X |
| 3,227,282 | 1/1966 | Punt | 211/41 X |
| 3,889,814 | 6/1975 | Rice | 211/41 X |
| 4,072,230 | 2/1978 | Mulligan | 211/41 X |
| 4,327,838 | 5/1982 | Cooke | 211/184 |
| 4,418,820 | 12/1983 | Nagle et al. | 211/41 X |
| 4,560,072 | 12/1985 | Burrell | 211/88 X |
| 4,697,776 | 10/1987 | Edson | 211/88 X |
| 4,708,239 | 11/1987 | Bourbon | 211/42 X |

FOREIGN PATENT DOCUMENTS 0095810 12/1983 European Pat. Off. ........... 211/42

Primary Examiner—Karen J. Chotkowski
Attorney, Agent, or Firm—Lon H. Romanski

[57] ABSTRACT

A storage rack for the storage of items such as video and audio recordings is shown as having a mounting portion by which the storage rack can be mountably secured to an associated support structure; the mounting portion carries a relatively lower disposed support for providing a generally upward support for the items to be stored on the storage rack and such mounting portion carries a relatively upper disposed constraining support for maintaining the items, stored on the storage rack, between the upper support and the associated support structure; the upper support is also positionable in an attitude generally behind the mounting portion to thereby serve as a support and enable the storage rack to become a free-standing unit.

25 Claims, 16 Drawing Sheets

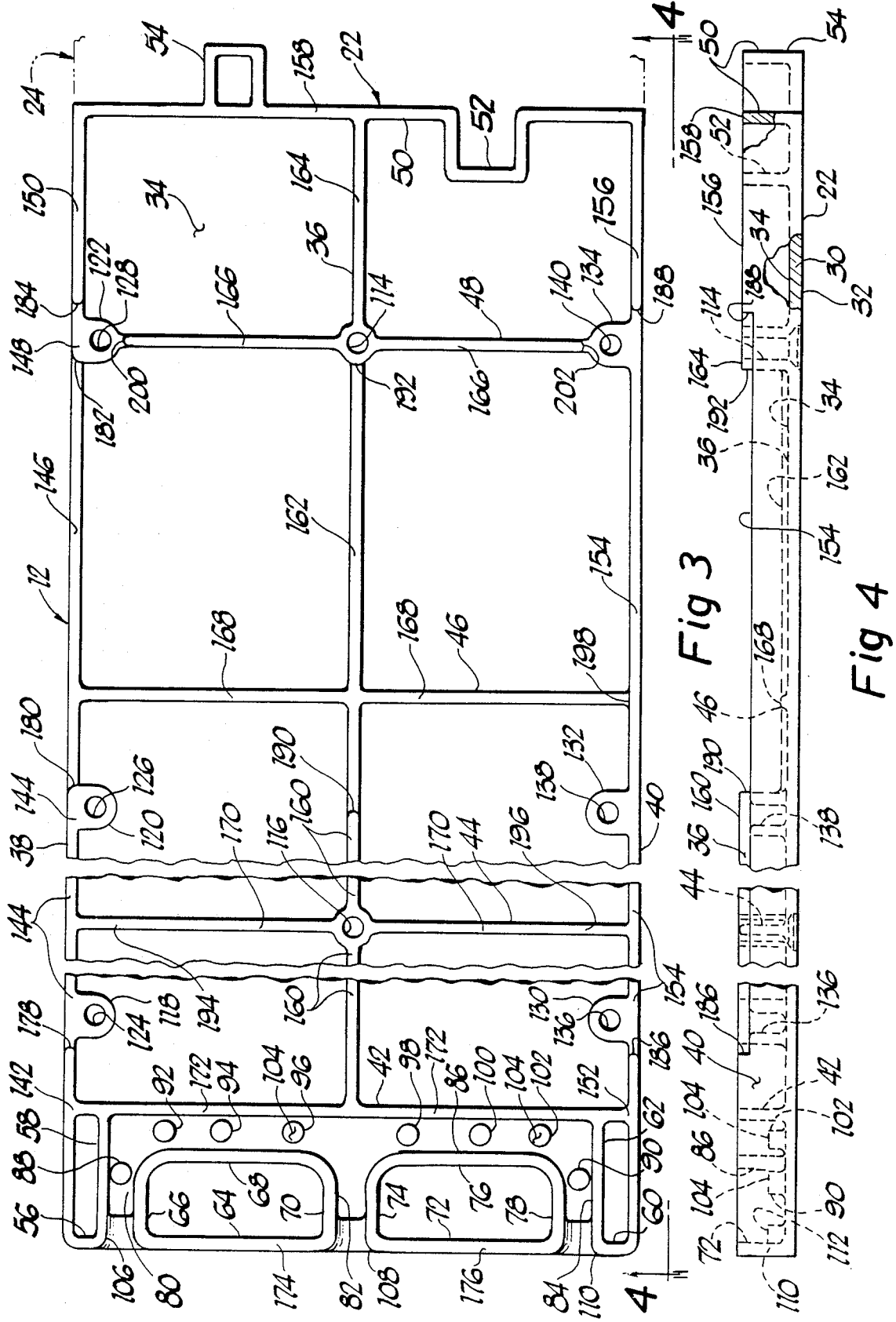

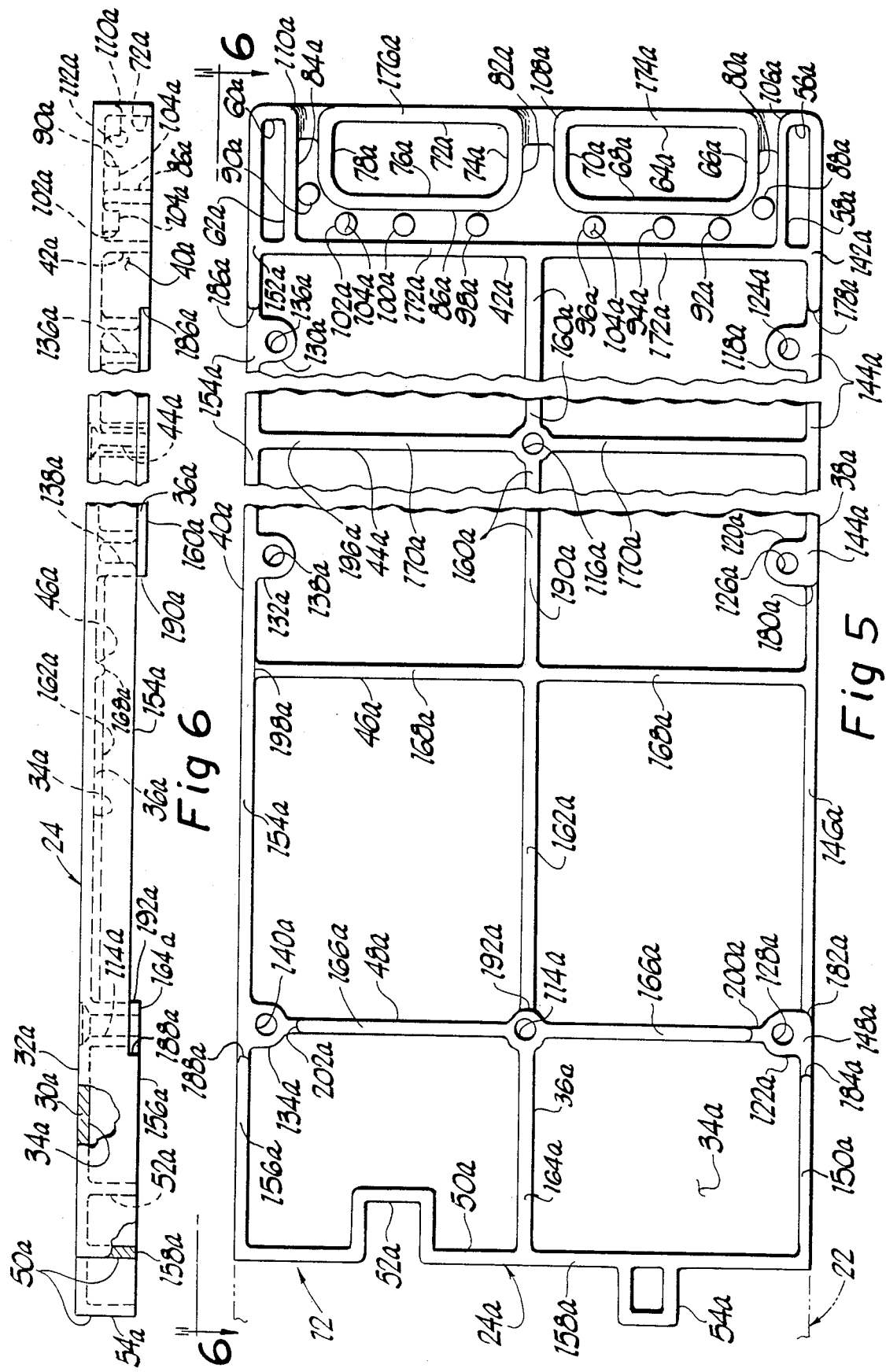

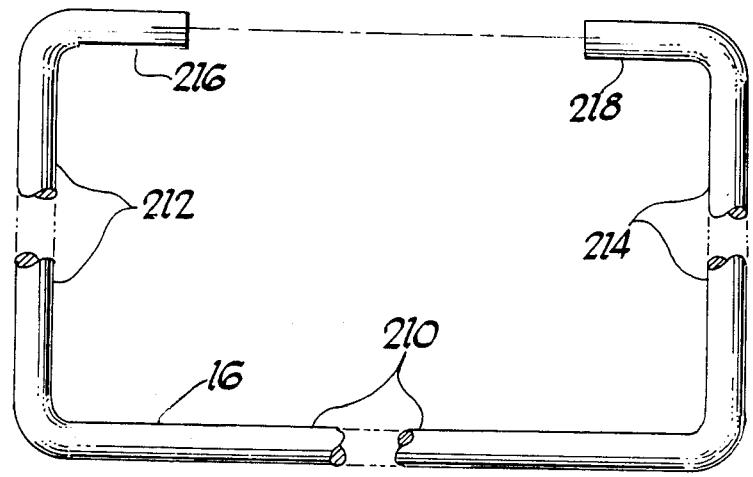
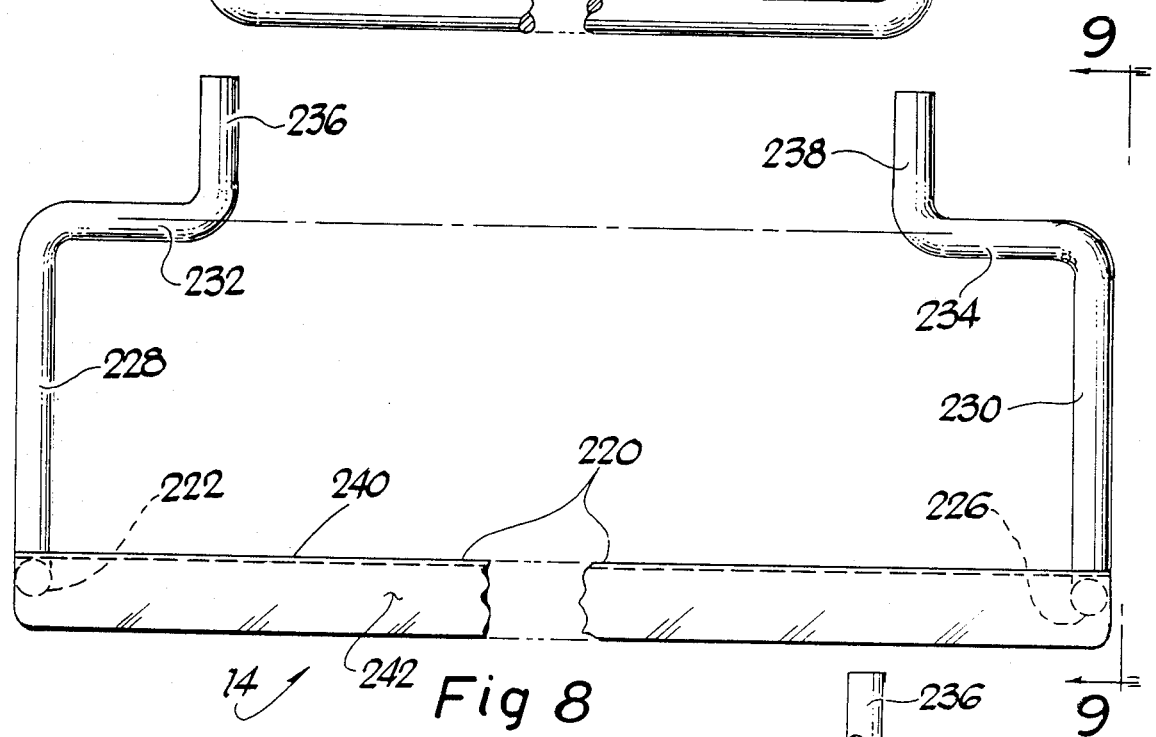
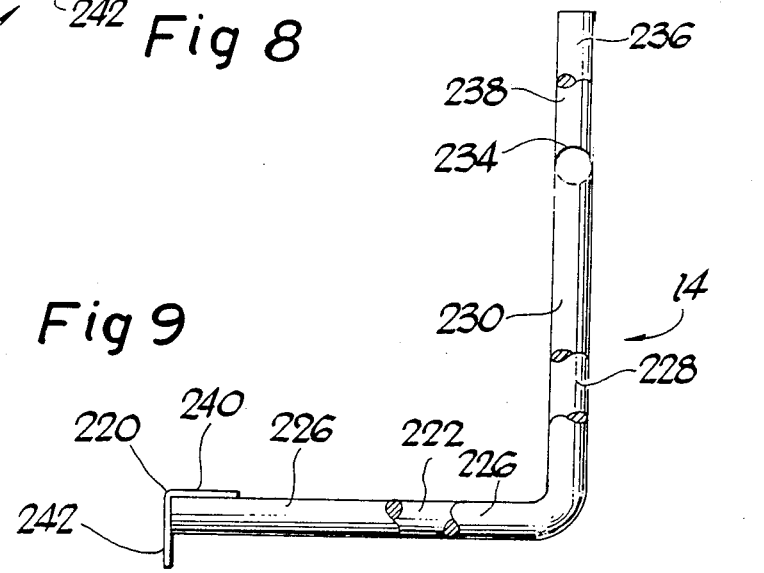

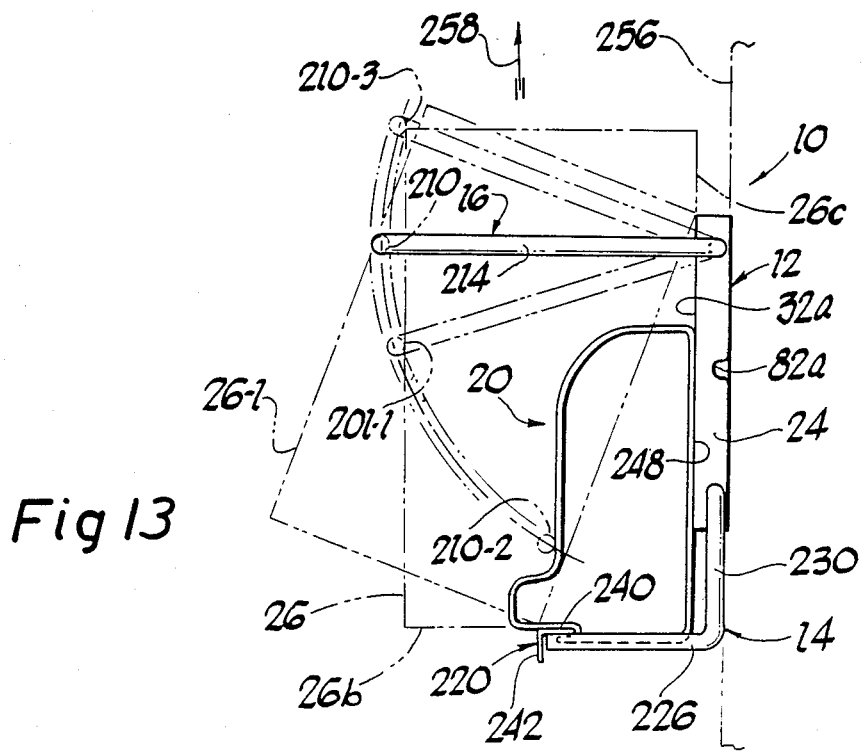
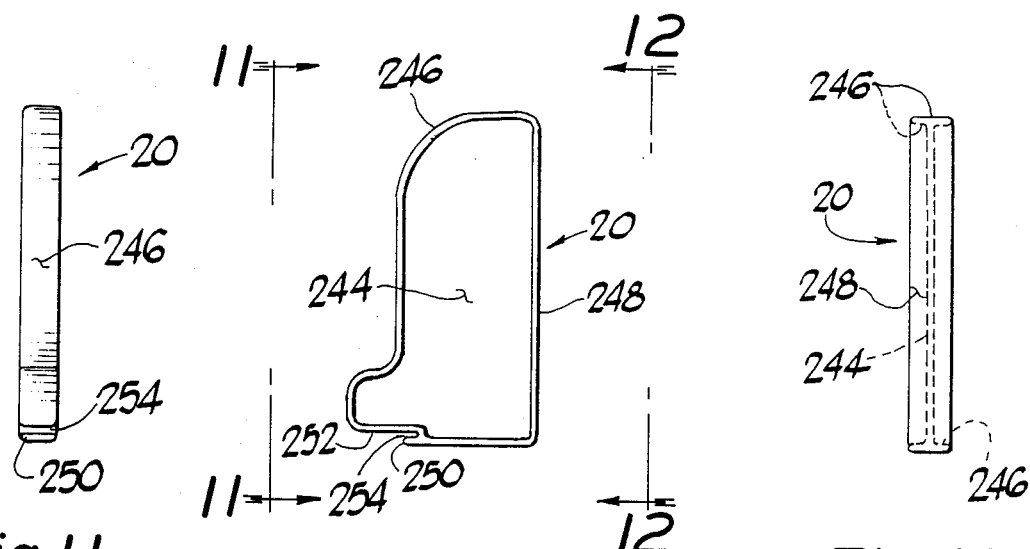
Fig 11  Fig 10  Fig 12

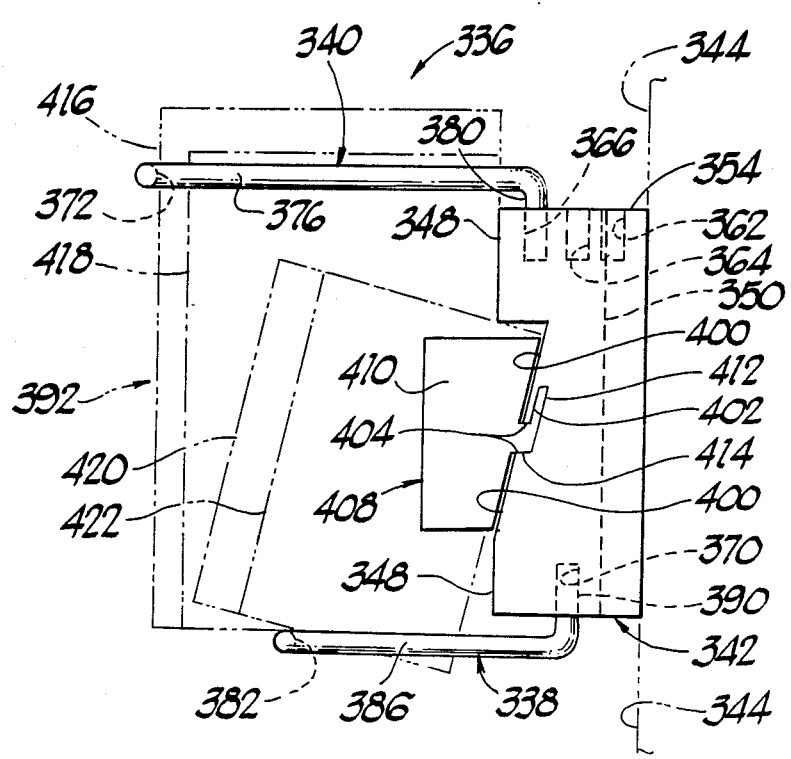
Fig 23
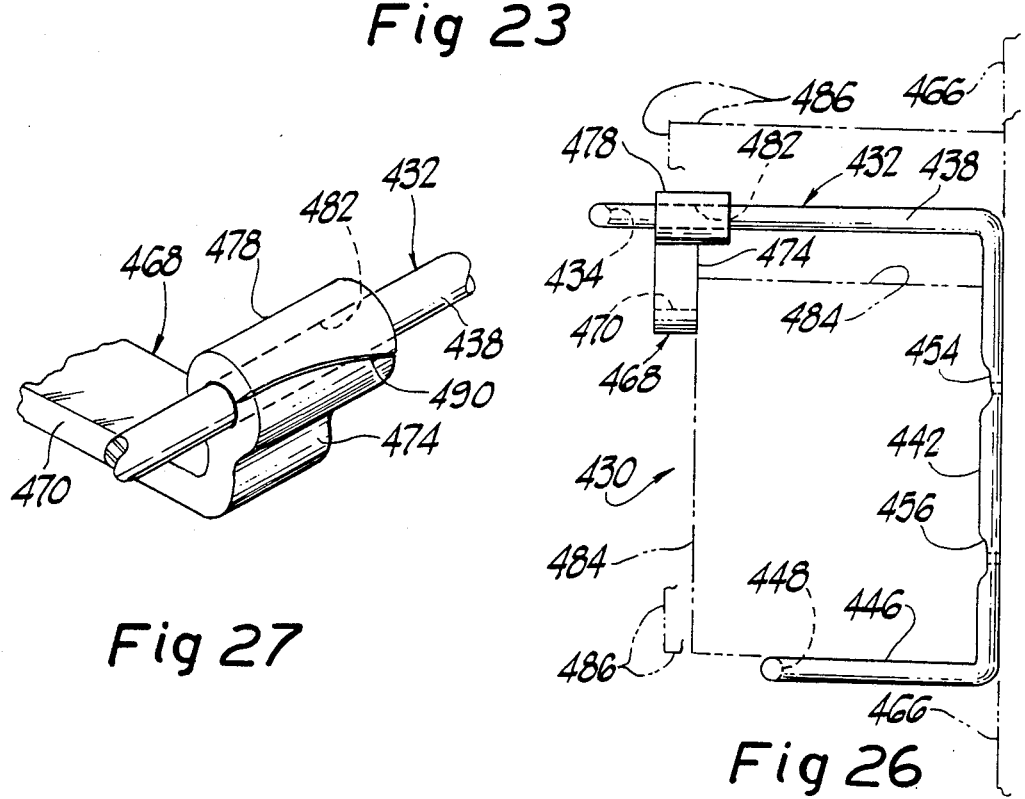
Fig 27
Fig 26

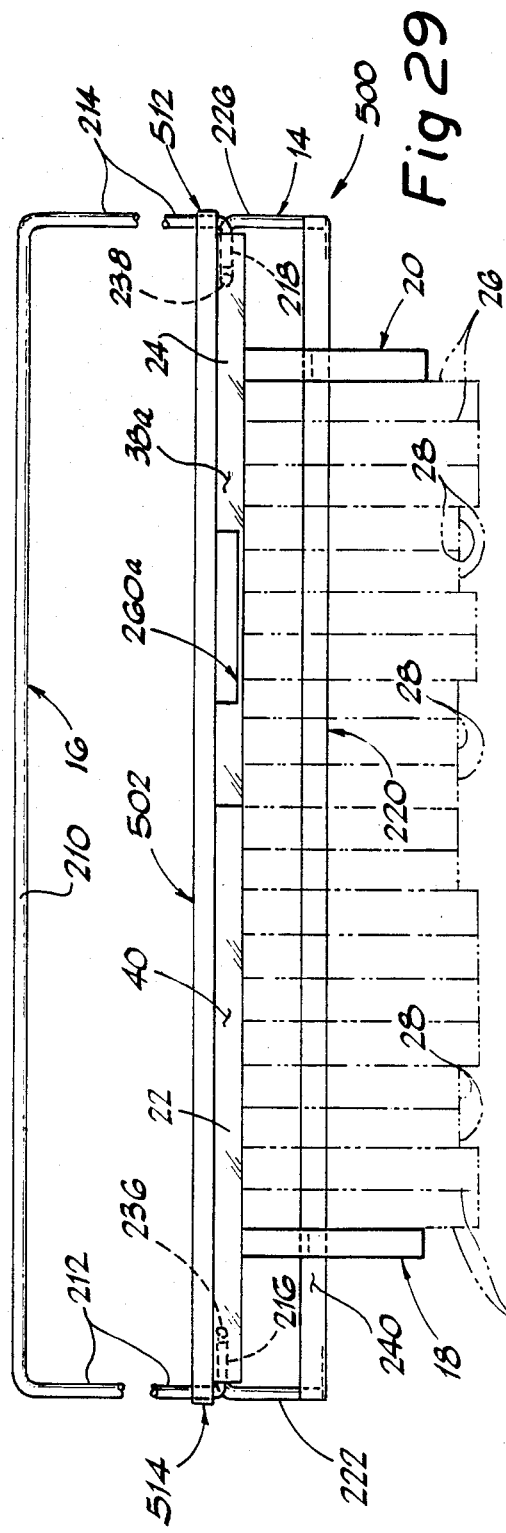
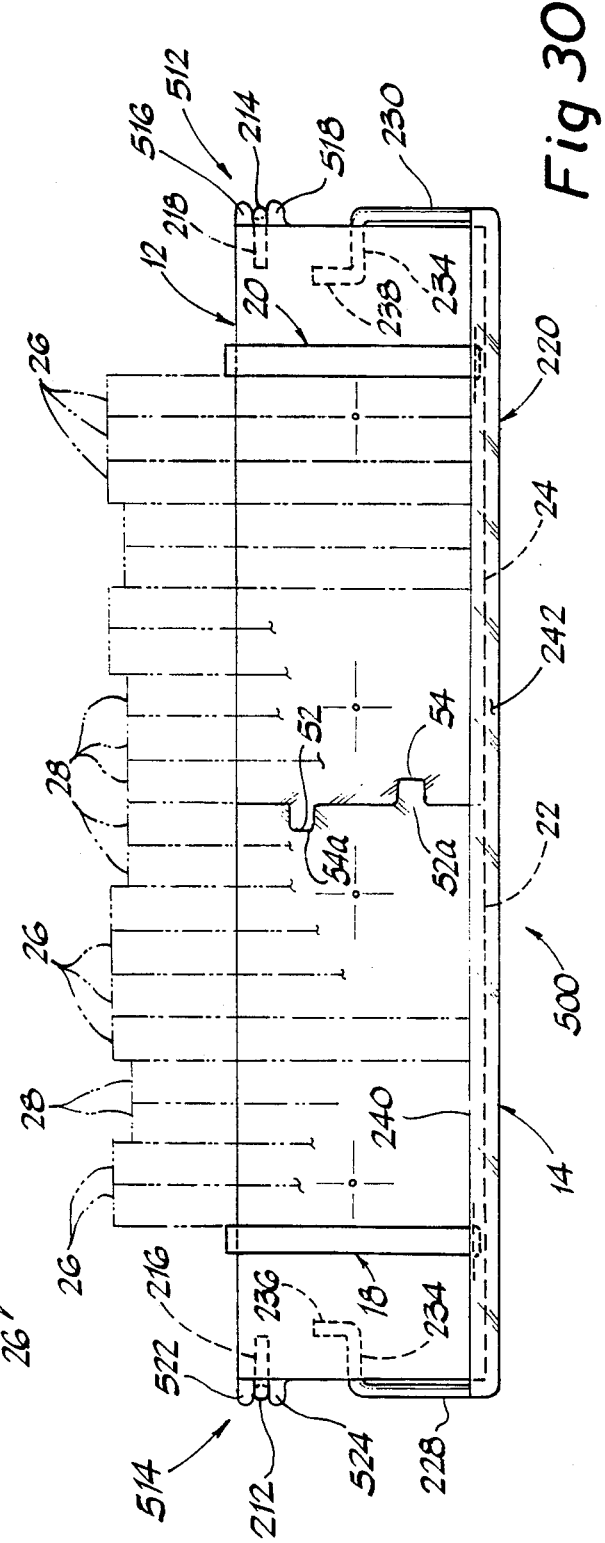

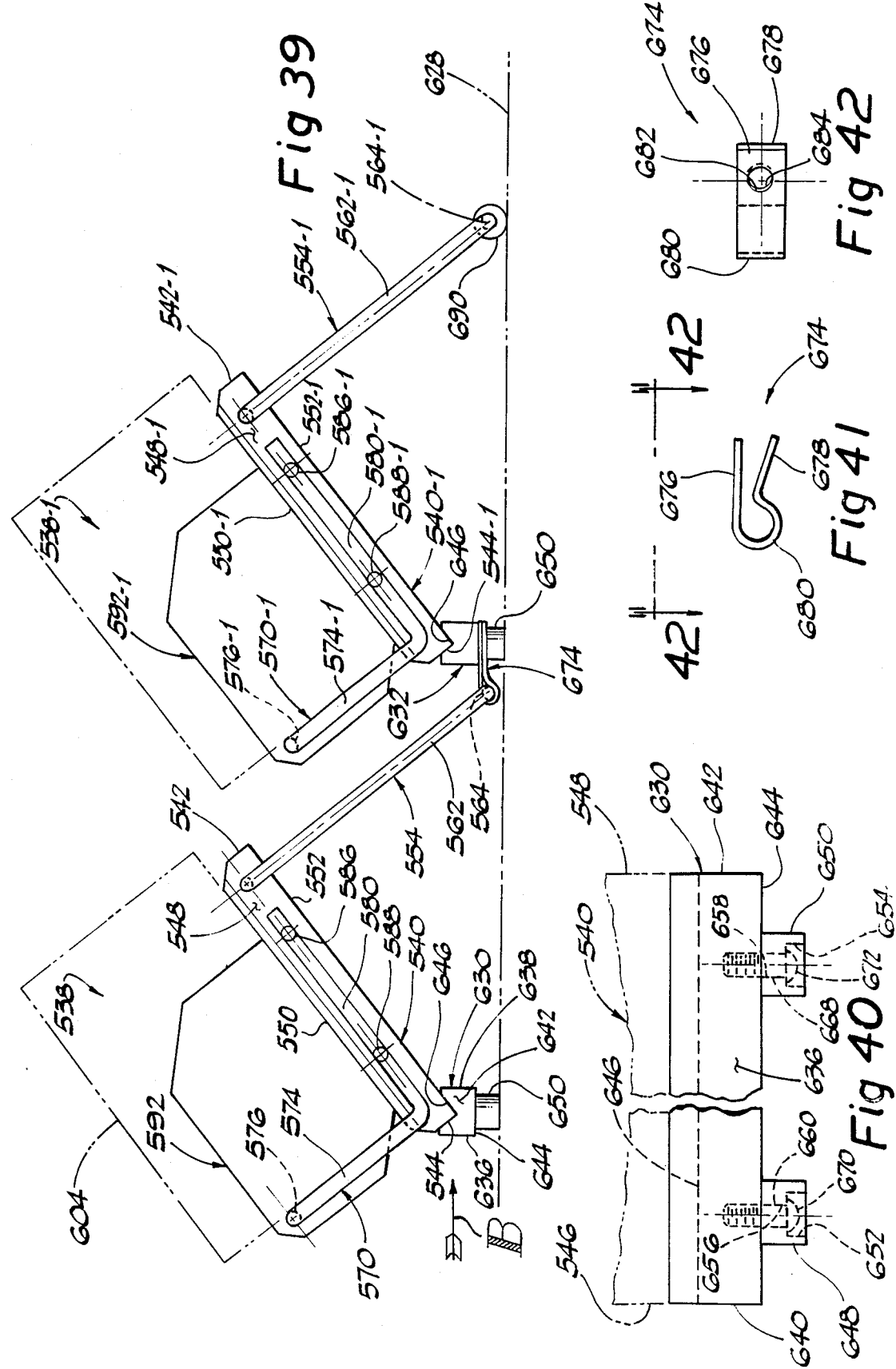

STORAGE RACK AND THE LIKE

RELATED APPLICATION

This application is a Continuation-in-Part of my copending application Ser. No. 195,951 filed May 19, 1988 now U.S. Pat. No. 4,867,318, for "Storage Rack and the Like".

FIELD OF THE INVENTION

This invention relates generally to storage apparatus and more particularly to such storage apparatus which is capable of storing articles of various dimensional sizes and yet permits ready access to any of such stored articles.

BACKGROUND OF THE INVENTION

The television industry, in all of its facets, has and continues to produce and vend both recorded and unrecorded television tapes. The recorded television tapes run the full spectrum of subject matter, as for example, educational and instructional material, copies of motion picture film ("movies") and sporting events. The unrecorded tapes are, for the most part, employed by the general public in recording such things as personally experienced events (which are sought to be preserved in time) and recording selected television broadcasts as for later viewing.

When such television tapes, both recorded and unrecorded, were first introduced into the marketplace, they were referred to as Video Cassette Recording Tapes and shortly thereafter, and at the present, such are referred to by the acronym, VCR, which has become a generic term for both recorded and unrecorded television tapes. (The acronym, VCR, will hereinafter be employed in its generic sense as applying to any and all cassettes of television recording tapes.)

The television industry has not settled on a unified size or format of VCR tape. For example, presently there are VCR tape formats commonly referred to as; VHS, BETA, 8 mm. and "C" or VHSC with each of such differing from the others not only in applied technology but also in physical size and configuration.

It is common for individuals and/or households (having VCR recording and/or play-back apparatus) to attain an expanding library of recorded VCR tapes by the continued accumulation of a plurality of recorded VCR tapes which are desired to be preserved in that recorded state. Further, it is not rare that such a library of recorded VCR tapes may be comprised of two or more differing formats as, for example, any of the formats hereinbefore identified. Also, many of such individuals or households have a continuing expanding library of audio recordings which may be in the form of tapes and/or disks. Again, the physical dimensions of such audio recordings differ from the various video formats hereinbefore identified.

The greater in number of recorded VCR tapes and/or audio recordings comprising such a library, the greater, of course, becomes the problem of physically storing them especially in a manner which permits the ready access to any selected one or more of the recordings as for play-back purposes. This problem is further compounded by the fact that if the library is comprised of two or more formats of recorded VCR tapes, and possibly audio recordings, the physical sizes and configurations of such recorded VCR tapes and audio recordings vary from each other. Also, in households having a number of members, some of which may be of relatively young age, it is highly desirable that the library of recordings be stored in a manner whereby, in the main, access to the library may be restricted as to prevent the generally unauthorized use of any of such recordings thereby preventing for example, as in the case of tape recordings, the accidental or undesired electronic removal of the material recorded on such tapes. Also, such restricted access to the library of recordings may well prevent physical damage thereto or loss thereof.

Further, in some households, for personal reasons (aesthetic or other) it is desired not to store the library of recorded VCR tapes as to be in clear view of, for example, guests of that household and yet ready access to the library of tapes is desired.

Heretofore, the prior art has failed to provide any storage system or structure which would fulfill the aforestated needs and desires.

The invention as herein disclosed and described is primarily directed to meeting the aforestated needs as well as to the solution of other related and/or attendant problems of storage of recordings whether such be audio or video.

SUMMARY OF THE INVENTION

According to the invention, a storage rack for the storage of recordings and the like, comprises mounting means, said mounting means comprising elongated body means having opposed upper and lower relatively long body side edges and opposed first and second relatively short body end edges, said elongated body means further comprising opposed relatively rearwardly and forwardly situated surface means, wherein said forwardly situated surface means extends for at least most of the distance between said upper and lower relatively long body side edges and extends for at least most of the distance between said first and second relatively short body end edges, relatively upper disposed upper support means carried by said mounting means, wherein said upper support means comprises a first U-shaped member of a generally U-shaped configuration having a first bight portion joining spaced first and second legs, first journal means carried by said elongated body means and situated at said first relatively short body edge generally between said rearwardly and forwardly situated surface means, second journal means carried by said elongated body means and situated at said second relatively short body edge generally between said rearwardly and forwardly situated surface means, wherein said first leg comprises a first pivot portion connected to said first journal means, wherein said second leg comprises a second pivot portion connected to said second journal means, wherein with said first and second pivot portions being connected to said first and second journal means said first bight portion is situated forwardly of said forwardly situated surface means, relatively lower disposed lower support means carried by said mounting means, wherein said lower support means comprises a second U-shaped member of a generally U-shaped configuration having a second bight portion joining spaced third and fourth legs, wherein said third and fourth legs are connected to said elongated body means as to maintain said second bight portion in a fixed position relative to said elongated body means, wherein when in said fixed position said second bight portion is situated relatively forwardly of said forwardly situated surface means, wherein said first U-shaped member is pivotally swingable about said first and second journal means, wherein said first and second legs are each of a length whereby said first U-shaped member is pivotally swingable upwardly to an uppermost position whereat said first bight portion attains an elevation substantially above the elevation of said upper relatively long body side edge, wherein said first and second legs are each of a length whereby when said U-shaped member is pivotally swung from said uppermost position and toward a lower-most position forwardly of said forwardly situated surface means said first bight portion traverses a position which is disposed forwardly of said forwardly situated surface means a distance substantially greater than the distance by which said second bight portion is disposed forwardly of said forwardly situated surface means, wherein said second bight portion is effective for providing generally upward support to such recordings and the like as are placed thereatop, wherein when said first U-shaped member pivotally swings downwardly and forwardly of said forwardly situated surface means said lowermost position is determined by the engagement of said first bight portion with at least certain of such recordings and the like as are placed atop said second bight portion thereby having said first bight portion form a gate-like retainer generally containing said recordings and the like as are placed atop said second bight portion between said first bight portion and said forwardly situated surface means and maintaining said recordings and the like atop said second bight portion, wherein said first U-shaped member is also pivotally swingable as to cause said first bight portion to be disposed generally rearwardly of said relatively rearwardly situated surface means, and position holding means, said position holding means serving to hold said first U-shaped member in a selected position extending generally rearwardly of said relatively rearwardly situated surface means to thereby result in said first bight portion serving as a portion of a stand for vertically supporting said storage rack upon associated support surface means.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 3 is a view taken generally on the plane of line 3—3 of FIG. 1, looking in the direction of the arrows, and illustrating, in enlarged scale, one of the elements of the storage rack of FIG. 1, with such element being shown with portions thereof broken away;

FIG. 4 is a view, taken generally on the plane of line 4—4 of FIG. 3 and looking in the direction of the arrows;

FIG. 5 is a view taken generally on the plane of line 5—5 of FIG. 1, looking in the direction of the arrows, and illustrating, in enlarged scale, another of the elements of the storage rack of FIG. 1, with such element being shown with portions thereof broken away;

FIG. 6 is a view taken generally on the plane of line 6—6 of FIG. 5 and looking in the direction of the arrows;

FIG. 7 is an enlarged view of still another of the elements of the structure of FIGS. 1 and 2 with such being shown in relatively enlarged scale and with portions thereof being shown as broken away;

FIG. 8 is an enlarged view of yet another of the elements of the structure of FIGS. 1 and 2 with such being shown in relatively enlarged scale and with portions thereof being shown as broken away;

FIG. 9 is a view taken generally on the plane of line 9—9 of FIG. 8 and looking in the direction of the arrows;

FIG. 10 is a view taken generally on the plane of line 10—10 of FIG. 2, looking in the direction of the arrows, and illustrating another of the elements depicted in the structure of FIGS. 1 and 2;

FIG. 11 is a view taken generally on the plane of line 11—11 of FIG. 10 and looking in the direction of the arrows;

FIG. 12 is view taken generally on the plane of line 12—12 of FIG. 10 and looking in the direction of the arrows;

FIG. 13 is an end elevational view of the storage rack of FIGS. 1 and 2, taken generally on the plane of line 13—13 of FIG. 2 and looking in the direction of the arrows;

FIG. 23 is a view taken generally on the plane of line 23—23 of FIG. 22 and looking in the direction of the arrows;

FIG. 26 is a view taken generally on the plane of line 26—26 of FIG. 25 and looking in the direction of the arrows;

FIG. 27 is an enlarged, somewhat perspective view, of a fragmentary portion of the structure shown in FIGS. 24, 25 and 26;

FIG. 29 is a view taken generally on the plane of line 29—29 of FIG. 28 and looking in the direction of the arrows;

FIG. 30 is a view taken generally on the plane of line 30—30 of FIG. 28 and looking in the direction of the arrows;

FIG. 39 is an end elevational view of a plurality of the structure shown in FIG. 38 arranged in operative connection to each other;

FIG. 40 is an elevational view, in relatively enlarged scale, of one of the subassemblies shown in FIG. 39 and taken generally in the direction of arrow B;

FIG. 41 is a side elevational view, in relatively enlarged scale, of one of the elements shown in FIG. 39; and FIG. 42 is a view taken generally on the plane of line 42—42 of FIG. 41 and looking in the direction of the arrows.

DETAILED DESCRIPTION OF THE PREFERRED EMBODIMENT

Figure 1:
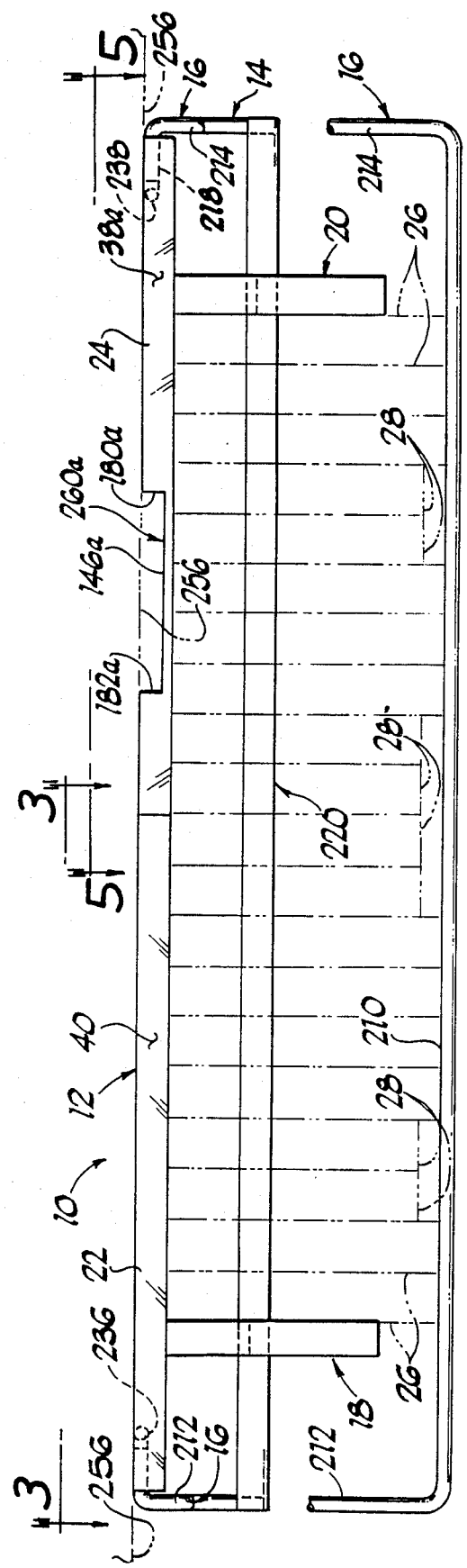
FIG. 1 is a top plan view of a storage rack employing teachings of the invention.
Figure 2:
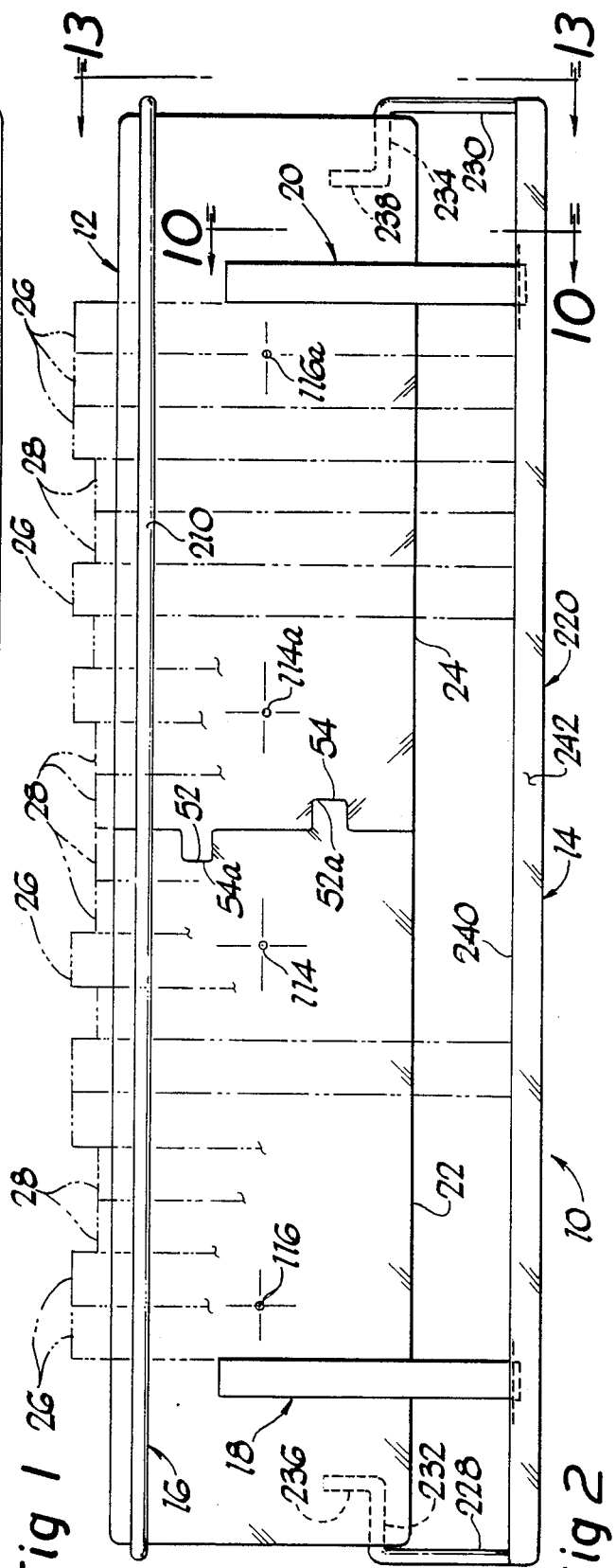
FIG. 2 is a front elevational view of the storage rack of FIG. 1.

Referring now in greater detail to the drawings, FIGS. 1 and 2 illustrate the storage rack 10 as comprising a back plate or body means 12 which, in turn, carries a lower disposed bottom support means 14, relatively upwardly situated retainer means 16 and, preferably, end plate or containment means 18 and 20. In the preferred embodiment, the body or mounting means 12 is comprised of two body or mounting portions or sections 22 and 24 which are formed to be identical to each other as will be described. Depicted in phantom line in both FIGS. 1 and 2 are a plurality of recordings such as, for example, VHS tapes as at 26—26 and Beta tapes as at 28—28.

Referring in greater detail to FIGS. 3 and 4, the body portion 22 of the mounting means 12 is illustrated as being preferably formed of molded plastic material such as, for example, ABS or high impact polystyrene. ABS is a term or acronym for any of a group of thermoplastics deriving such acronym, ABS, from the monomers which produce them; i.e., Acrylonitrile-Butadiene-Styrene while polystyrene is a thermoplastic synthetic resin of variable molecular weight depending on the degree of polymerization, derived by the polymerization of styrene by free radicals with peroxide initiator.

In the preferred embodiment, such body portion 22 is formed as to have a planar wall portion 30, facing forwardly when the mounting means 12 is secured to associated support means, with such wall portion 30 having a forwardly disposed planar surface 32 and an opposite rearwardly or inwardly disposed surface 34. The wall 30 is preferably integrally formed with a generally medially situated longitudinally extending rib or flange-like portion 36 as well as oppositely situated side walls 38 and 40. A plurality of transversely extending rib-like means 42, 44, 46, 48 and 50 are provided as to be integrally formed with the front or face wall 30, the medial wall 36 and side walls 38 and 40.

With particular reference to the right end of body portion 22, as viewed in FIG. 3, it can be seen that end wall 50 is formed as to provide an indented-like or recess-like portion 52 and is also formed as to provide an extending tongue-like or key-like portion 54. The physical sizes and configurations of the recess-like opening 52 and the tongue or extension 54 are such that if the extension 54 were to be inserted into the opening 52, the extension 54 would be totally and closely (even tightly) received within the opening or recess 52. As best seen in FIG. 4, the front or face wall 30 fully continues into and forms a part of the extension 54.

Referring to the left end of body portion 22, as viewed in FIGS. 1 and 2, it can be seen that side wall 38 extends to an integral end portion 56 and then, in somewhat a loop fashion, doubles back, as by a wall portion 58, to again be integrally joined with transverse wall 42. Similarly, side wall 40 extends to an integral end portion 60 and then, in somewhat a loop fashion, doubles back, as by a wall portion 62, to again be integrally joined with transverse wall 42.

Such left end of body portion 22 is also provided with an additional series of wall means. More particularly a first continuous looped wall is comprised of wall portions 64, 66, 68 and 70 all of which are integrally formed with the front or face wall 30 and a second continuous looped wall is comprised of wall portions 72, 74, 76 and 78 all of which are also integrally formed with the frontal or face wall 30. As best seen in FIG. 3: wall portions 66 and 58 are spaced from each other thereby defining a channel-like passageway 80 therebetween; wall portions 70 and 74 are spaced from each other thereby defining a channel-like passageway 82 therebetween; wall portions 78 and 62 are spaced from each other thereby defining a channel-like passageway 84 therebetween; and, transverse wall 42 is spaced from both wall portions 68 and 76 thereby defining a generally transversely extending channel-like passageway 86 therebetween. As is shown in FIG. 3, each of channels or passages 80, 82 and 84 is in communication with channel or passage 86.

A plurality of support pads, bosses or the like are formed as to be generally within such channels or passages 80, 84 and 86. Such pads are preferably integrally formed with frontal wall 30 as to be extending, to a preselected distance, away from inner surface 34 of wall 30. More particularly a first support pad or boss 88 is situated generally in channel or passage 80 as to be generally between wall portions 58 and 66 while a second support pad 90 is situated generally in channel or passage 84 as to be generally between wall portions 78 and 62. A first series of support pads or bosses 92, 94 and 96 are situated generally in channel or passage 86 as between wall portion 68 and transverse wall 42 while a second series of support pads 98, 100 and 102 are situated generally in channel or passage 86 as between wall portion 76 and transverse wall 42. Each of such support pads is formed to have a projecting end surface 104, and, preferably all of such end surfaces 104—104 lie in a common plane as typically illustrated in FIG. 4. The entry to each of channels or passages 80, 82 and 84 is preferably of a flared configuration, as at 106, 108 and 110, respectively, with each of such terminating at a height, as typically at 112 of FIG. 4, which is coplanar with end support surfaces 104—104 of the support pads.

As best seen in FIG. 3, generally at the intersection of medial wall 36 and transverse wall 48 a first through hole or clearance passage 114 is formed as to extend through the front surface 32 of frontal wall 30 and such passage 114 is preferably formed with a countersunk configuration as in the face of frontal wall 30 whereby a mounting screw or the like (not shown) may be inserted therethrough with the head of such screw being recessed within the complementary countersink. Similarly, and for the same purpose, a clearance passageway 116 is formed, as at the intersection of medial wall 36 and transverse wall 44, as to extend through the front surface 32 of frontal wall 30.

Further, in the preferred embodiment of the body section 22, a plurality of boss-like enlargements 118, 120 and 122 are formed, integrally with frontal wall 30 and side wall 38, as to be spaced generally along side wall 38. Such enlargements are, in turn, formed with blind holes or passages 124, 126 and 128, respectively, as not to extend through the frontal wall 30. Similarly, a plurality of boss-like enlargements 130, 132 and 134 are formed, integrally with frontal wall 30 and side wall 40, as to be spaced generally along side wall 40. Such enlargements are also, in turn, formed with blind holes or passages 136, 138 and 140, respectively, as not to extend through the frontal wall 30.

As will hereinafter be described in detail, the projecting end surfaces of the various walls and/or ribs integrally formed with frontal wall 30 are at differing elevations, employing, for example, the face surface 32 of frontal wall 30 as a plane of reference. Such various projecting end surfaces (as well as portions thereof) will be referred to by separate reference numbers for ease and clarity of description.

Side wall 38 will be considered as having projecting end surface portions 142, 144, 146, 148 and 150; side wall 40 will be considered as having projecting end surface portions 152, 154 and 156; end wall 50 will be considered as having a projecting end surface 158 which extends for the full length thereof including the recess 52 and extension or tongue 54; medial rib or web 36 will be considered as having projecting end surface portions 160, 162 and 164; transverse wall 48 will be considered as having a projecting end surface portion 166 which also generally circumscribes clearance passageway 114; transverse wall 46 will be considered as having a projecting end surface portion 168; transverse wall 44 will be considered as having a projecting end surface portion 70 which also generally circumscribes clearance passageway 116; transverse wall 42 will be considered as having a projecting end surface portion 172; the generally looped wall, comprised of wall portions 64, 66, 68 and 70, will be considered as having a projecting end surface portion 174; and the generally looped wall, comprised of wall portions 72, 74, 76 and 78, will be considered as having a projecting end surface portion 176.

Further, as also to be more specifically described, there are a plurality of step or transitional surfaces which effectively form a juncture as between adjoining or adjacent pairs of such projecting end surfaces as hereinbefore described. With reference to both FIGS. 3 and 4 and referring first, generally, to wall 38, some of such transitional surfaces are depicted at 178, 180, 182 and 184; generally, along wall 40, other of such transitional surfaces are depicted at 186 and 188; generally, along medial rib 36, still other of such transitional surfaces are depicted at 190 and 192; generally, along transverse wall 44, additional ones of such transitional surfaces are depicted at 194 and 196; generally, along transverse rib 46, a transitional surface may be considered as existing at 198, that being where rib 46 effectively joins wall 40; and generally, along transverse wall 48 further transitional surfaces are depicted at 200 and 202.

Still with reference to FIGS. 3 and 4, the various projecting end surfaces extend away from the frontal wall 30 as to be generally in differing planes which, in turn, are spaced from wall 30 at distances differing from each other. The terms "highest", "intermediate" and "lowest" or "closest" as hereinafter used with regard to such differing planes are intended to respectively refer to: (a) the plane which is generally parallel to and spaced furthermost from face surface 32 of wall 30; (b) the plane which is generally parallel to and next furthermost spaced from face surface 32 of wall 30; and (c) the plane which is generally parallel to and spaced the closest to face surface 32 of wall 30.

With the foregoing in mind and starting at the left end (as viewed in FIG. 3) of the body section 22, the projecting end surface 142 of wall 38 (starting at transitional surface 178) along with the projecting end surface of wall portions 56 and 58, the projecting end surface 152 of wall 40 (starting at transitional surface 186) along with the projecting end surface of wall portions 60 and 62, the projecting end surfaces 174 and 176, the projecting end surface 160 of medial rib 36 and extending to transitional surface 190, and the projecting end surface 170 of transverse wall 44 and extending between transitional surfaces 194 and 196 are preferably generally contained in the plane which is "highest" as hereinbefore described.

Referring now to the right end (as viewed in FIG. 3) of the body section 22, the projecting end surface 158 of wall 50, the effectively continuing projecting end surface 150 generally along wall 38 and terminating as at transitional surface 184, the effectively continuing projecting end surface 156 generally along wall 40 and terminating as at transitional surface 188, projecting end surface 164 of medial wall or rib 36 effectively extending from projecting end surface 158 and terminating as at transitional surface 192, and projecting end surface 166 of transverse wall 40 and extending between transitional surfaces 200 and 202 are preferably generally contained in the same said "highest" plane thereby resulting in all of such projecting end surfaces, as have been described as generally contained in said "highest" plane being furthermost spaced from the general plane of face surface 32 of frontal wall 30.

The "intermediate" plane would generally contain projecting end surfaces 144, 148 and 154 which, for purposes of clarity, may be described as respectively comprising the following. Projecting end surface 144 (of wall 38) would extend as between transitional surfaces 178 and 180 and would include the surfaces of the enlargements 118 and 120 generally circumscribing blind holes or passages 124 and 126, as well as extend for a distance along transverse wall 44 to the transitional surface 194. Projecting end surface 148 (of wall 38) would extend as between transitional surfaces 182 and 184, generally circumscribe the blind hole or passage 128 of enlargement 122 and possibly extend somewhat along transverse wall 48 as to transitional surface 200. Projecting end surface 154 (of wall 40) would extend as between transitional surfaces 186 and 188, generally circumscribe the blind holes or passages 136, 138 and 140 of enlargements 130, 132 and 134, extend for some distance along transverse wall 44 as to transitional surface 196 and possibly extend somewhat along transverse wall 48 to transitional surface 202.

The "lowest" or "closest" plane would generally contain projecting end surfaces 146, 162 and 168 which, for purposes of clarity, may be described as respectively comprising the following. Projecting end surface 146 (of wall 38) would extend as between transitional surfaces 180 and 182. Projecting end surface 162 would extend along medial rib 36 as between transitional surfaces 190 and 192; while projecting end surface 168 would extend (at the same elevation or level of surface 146) along transverse rib 46 from surface 146 until it effectively abutted against the inner side of wall 40 thereby defining a transitional surface 198 as between surfaces 168 and 154. For purposes of disclosure, transitional surfaces 180 and 190 and the right-most (as viewed in FIG. 3) side or edge of enlargement 132 may be considered as being in general alignment; similarly, transitional surfaces 182 and 192 and the left-most (as viewed in FIG. 3) side or edge of enlargement 134 may be considered as being in general alignment.

Accordingly, in view of the foregoing, it can be seen that there is a pocket-like space or recess which is defined at: (a) the left side (as viewed in FIG. 3) by the generally aligned transitional surfaces 180 and 190 and the said right-most side of enlargement 132; (b) the right side (as viewed in FIG. 3) by the generally aligned transitional surfaces 182 and 192 and the said left-most side of enlargement 134; and (c) the relatively higher elevation of projecting end surface 154 (generally between enlargements 132 and 134) as compared to the lower elevation of the projecting end surface 146 of the oppositely disposed wall 38. The benefits of such pocket or recess means will be hereinafter described.

The other cooperating body section 24 is illustrated in FIGS. 5 and 6. As an inspection thereof will show, body sections 22 and 24 are made as to be preferably identical to each other. Therefore, all elements in FIGS. 5 and 6 which correspond to those elements disclosed in FIGS. 3 and 4 are identified with like reference numbers provided with a suffix "a". When the two body sections 22 and 24 are brought together and operatively joined, or connected, as to form the mounting means 12 (as best seen in FIG. 2), the extension or tang 54a of body section 24 is closely received in cooperating recess or keying slot 52 of body section 22, while the extension or tang 54 of body section 22 is closely received in cooperating recess or keying slot 52a of body section 24.

Referring in greater detail to FIG. 7, in conjunction with FIGS. 1 and 2, the upper support means or bar 16 is depicted as preferably comprising a cylindrical steel rod having an axially elongated forwardly (when assembled) disposed portion 210 with oppositely situated arm portions 212 and 214 which, in turn, respectively terminate in inwardly directed axially aligned pivot portions 216 and 218.

Referring in greater detail to FIGS. 8 and 9, in conjunction with FIGS. 1 and 2, the lower support means 14 is depicted as preferably comprising a longitudinally extending support portion 220 which, in turn, as at its opposite ends, has respective arm portions 222 and 226. Such arm portions 222 and 226 are, in turn, respectively provided with depending leg portions 228 and 230. The upper ends (as viewed in FIGS. 8 and 9) of leg portions 228 and 230 are respectively provided with inwardly directed, axially aligned, arm-like portions 232 and 234 which, in turn, are respectively provided with generally upwardly extending arm-like portions 236 and 238. In the preferred embodiment, the ends (respectively comprised of 222, 228, 232, 236 and 226, 230, 234, 238) are formed of cylindrical steel rod material while the support portion 220 is preferably formed of relatively thin flat steel stock which is in turn longitudinally formed as into a 90° "V" configuration (as viewed in FIG. 9) having an upper situated plate-like portion 240 and a depending forwardly disposed portion 242. The longitudinally extending support portion 220 may be fixedly secured to the respective free ends of arm portions 222 and 226, in the configuration depicted, as by, for example, welding.

In the preferred embodiment, end containment plates or members 18 and 20 are also employed. Referring in greater detail to FIGS. 10, 11 and 12, end containment member 20 is illustrated as being comprised of a generally medially disposed main body 244 about the periphery of which is integrally formed a generally continuous flange 246 which, as best seen in FIG. 12, may extend to either side of the main body 244. Further, in the preferred embodiment, what could be considered as the rearwardly situated peripheral flange portion has an outer surface 248 which is generally planar so that such can slidably contact the front face 32a and/or 32 of the mounting means 12.

At the generally lower end, as best seen in FIGS. 10 and 11, the peripheral flange 246 is formed as to have a projecting extension portion 250 which is downwardly spaced from a further forwardly situated and extending flange portion 252. In the preferred embodiment flange portion 252 is generally planar, in its outer surface, and generally normal to the plane of the outer surface of flange portion 248. Because of the relationship and general configurations of flange extension 250 and flange portion 252 a slot-like recess 254 is formed generally therebetween. End containment member 18 (FIGS. 1 and 2) may be considered as identical to end containment member 20, as described with reference to FIGS. 10, 11 and 12, and both members 18 and 20 may be formed of any suitable material such as, for example, ABS or high impact polystyrene.

The various elements heretofore described when assembled into the storage rack means 10 of FIGS. 1, 2 and 13, will have the following relationships and mode of operation.

The body sections 22 and 24 (FIGS. 3 and 4 and FIGS. 5 and 6) are operatively and effectively joined to each other, in end-to-end relationship by inserting extension 54 (FIG. 3) into cooperating recess 52a (FIG. 5) and simultaneously inserting extension 54a (FIG. 5) into cooperating recess 52 (FIG. 3) as to thereby result in an assembled relationship, therebetween, as generally depicted in FIG. 2 and comprise the support means 12.

The upper support means or bar 16 (FIG. 7) has its pivot portions 216 and 218 respectively pivotally received in channel 84 (FIG. 3) and channel 80a (FIG. 5) thereby assuming a relationship as generally depicted in FIG. 1.

The end containment members 18 and 20 each receive the plate-like portion 240 (FIGS. 8 and 9), of the lower support bar or means 14, within their respective slots or recesses 254 (FIGS. 10 and 11) as to have the rearward generally planar surfaces 248—248 in juxtaposition to face surfaces 32 and/or 32a of body sections 22 and 24.

The lower support means 14, in turn, is operatively engaged with body sections 22 and 24 by having one end thereof retained by body section 22 and the other thereof retained by body section 24. More particularly, inwardly directed portion 232 and upwardly directed portion 236 (FIGS. 8 and 9) are respectively simultaneously received in channel 80 and channel 86 of body section 22 (FIG. 3) while the oppositely inwardly directed portion 234 and the cooperating upwardly directed portion 238 (FIGS. 8 and 9) are respectively simultaneously received in channel 84a and 86a of body section 24 (FIG. 5). When such ends of lower support means 14 are thusly received within such channels, portion 232 would lie as against the end surface of boss or pad 88 while portion 236 would lie as against the end surfaces 104 of bosses or pads 92 and 94 (FIG. 3). Similarly, portion 234 would lie against the end surface of boss or pad 90a while portion 238 would lie as against the end surfaces 104a of bosses or pads 102a and 100a (FIG. 5).

The entire assembly 10, mounted to a chosen support structure 256 as by screws extending through passages 116, 114, 116a and 114a, would assume a position as generally depicted in FIGS. 1, 2 and 13.

As is evident from an inspection of FIG. 13, the upper support bar or containment means 16 is rotatable or swingable about its pivot portions (216, 218 FIG. 7) to any number of swingable positions as to thereby correspondingly position its longitudinally extending forward containment bar portion 210 at varying distances away from the frontal face of the support means 12; selected ones of such positions are depicted at 210, 210-1, 210-2 and 210-3 of FIG. 13.

For purposes of illustration, a VHS tape (and as possibly provided with an outer sleeve-like cover as is known in the art), is depicted in phantom line at 26 with the bottom surface or face 26b thereof resting upon the lower support means 14 and, in particular, portion 240 of the longitudinal portion 220 of such support means 14. The back or rear surface 26c of the VHS tape 26 is shown as being in abutting engagement with the juxtaposed forward face of the support means 12. Serving to hold the VHS 26 in such stored position is the upper support means 16 swung downwardly to where the longitudinal portion 210 thereof abuts against the forwardly situated face of the VHS tape or recording 26 as depicted at 210-1. With the VHS tape recording 26 (or a plurality thereof) thusly stored, let it be assumed that it is desired to remove the VHS recording 26 from the storage rack means 10. Such can be done simply as by grasping an upper portion of the VHS recording 26 and lifting it vertically, as in the direction of arrow 258, upwardly from between the front face of the mounting means 12 and the opposed longitudinal portion 210 of upper support means 16. Another way of removing the stored VHS 26 would be to in effect grasp (or tend to lift) the forward lower portion 26b of VHS 26 and generally swing such VHS 26 lower portion forwardly and somewhat upwardly until the lower right (as viewed in FIG. 13) corner thereof passes beyond lower support portion 240 as generally depicted in FIG. 13 by the VHS 26 drawn in position 26-1. At that point, the VHS 26-1 may be slid generally angularly downwardly past support portion 240 until the uppermost portion of VHS 26-1 passes by the upper support longitudinal portion 210. It should now be apparent that as such VHS 26 is being swingably removed, the upper support means 16, if initially in a position as that at 210-1, will also swing somewhat upwardly because of the engagement between the longitudinal portion 210, thereof, and the forwardly disposed face of the VHS 26 being swingably removed.

As should also now be apparent, the storage rack means 10 is capable of storing various sizes of recordings. For example, for recordings which are narrower than that depicted by 26 of FIG. 13, the upper support means 16 would merely swing correspondingly further downwardly from the position of 210-1 until the longitudinal containment portion 210 engaged the forwardly disposed surface of such narrower recording. In effect, the upper support means 16 comprises adjustable containment means for adjusting to the size of the recording and containing such recording as between itself and the opposed surface as 32 and/or 32a.

The end containment means or members 18 and 20, operatively engaged with and guided by portion 240 of lower support means 16, are slidably movable to selected positions as to thereby contain therebetween the various stored recordings as generally depicted in FIGS. 1 and 2 and prevent such stored recordings from possibly falling sideways (as viewed in FIG. 2). It is, of course, possible to eliminate the end containment means 18 and 20, as by their removal, especially in those situations where the entire storage rack means 10 is filled with recordings since at that time the arms 212 and 214 of the upper adjustable containment means 16 would serve to prevent such stored recordings from possibly falling sideways.

In some situations, the size and configuration of the stored recordings may be such as to result in somewhat marginal contact as between the forwardly disposed surface of the recording (or its jacket or cover) and the longitudinal portion 210 of the upper adjustable containment means 16. For example, with compact disc audio (CD) recordings, the longitudinal portion 210 of the swingable containment means 16 may just barely engage the forwardly disposed surface (of the CD recording jacket) at its upper end. Therefore, in those situations the invention provides means whereby the lower support means 14 may be adjusted upwardly, relative to the mounting means 12 and upper containment means 16. More particularly, especially with reference to FIGS. 3, 5 and 13, the invention as herein previously described as being in its assembled state, was described as having the oppositely directed axially aligned portions 232 and 234 of lower support means 1 respectively received in channels 80 and 84a of body sections 22 and 24. Such a resulting relationship is, of course, depicted in FIG. 13. However, if the lower support means 14 is to be raised, such axially aligned portions 232 and 234 would instead be respectively received in channels 82 and 82a of body sections 22 and 24 with the upwardly projecting ends 236 and 238 being respectively received in channel 86 (laid as against bosses 98 and 100) and in channel 86a (laid as against bosses 96a and 94a). As a consequence, of course, the recordings would be raised relative to the pivot means of the upper containment means 16 thereby providing for the greater assured contact as between the recordings and containment portion 210.

In the preferred embodiment, the body sections 22 and 24 are formed identical to each other so that when the two body sections 22 and 24 are assembled to each other (as by the cooperating extensions 54, 54a and recesses 52, 52a, which also function as keying means) there is really no single edge which would have to be the upper edge nor is there any single edge which would have to be the lower edge when assembled with the other related elements. That is, once the body sections 22 and 24 are thusly assembled to each other the upper edge (as in either FIGS. 2 or 13) of the mounting means 12 may be comprised of aligned wall portions 40 and 38a or the upper edge may be comprised of aligned wall portions 38 and 40a. Regardless of which is selected to be the upper edge of the mounting means 12, the attachment of both the upper adjustable containment means 16 and the lower support means 14 is accommodated by symmetrically situated channels formed at the functionally outer ends of both body sections 22 and 24.

Further, as described in detail with reference to FIGS. 3 and 4, in the preferred embodiment a pocket-like clearance or slot is defined as by the plane of edge surface portions 146, 162 and 168 and the cooperating transitional surfaces as 180, 190, 182 and 192 with edge surface 154 extending significantly above the level of edge surface portion 146 thereby having that portion of wall 40 directly opposite to surface portion 146 function as an end stop or closure of the pocket or recess. The same, of course, exists in body section 24 of FIGS. 5 and 6.

It will be noted that when the body sections 22 and 24 are operatively connected to each other (via 54, 52a and 54a, 52), the opening to the pocket in body section 22 is from a first longitudinal side of the mounting means 12 while the opening to the pocket or recess in body section 24 is from the opposite longitudinal side of the mounting means 12. Such pocket means opening is depicted as being comprised of 182a, 146a and 180a of FIG. 1. (For ease of reference such pocket or recess will be identified by reference number 260a.) It will also be noted that when the mounting means 12 is applied or secured to the associated support structure 256 (as in FIGS. 1 or 13) that such support structure 256 serves to establish or provide the remaining confining plane defining the overall pocket or recess 260a. Such pocket or recess 260a may then be employed for the placement therein of related accessory means.

Figure 14:
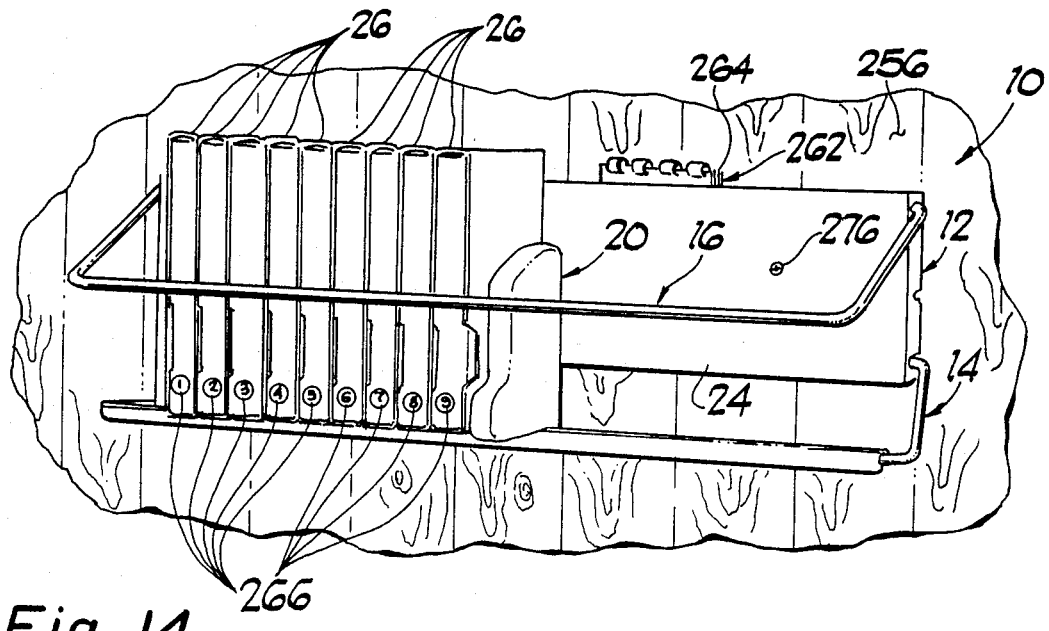
FIG. 14 is a somewhat perspective view of the storage rack of FIGS. 1, 2 and 13 mounted on associated support structure as, for example, a wall of a room.
Figure 15:
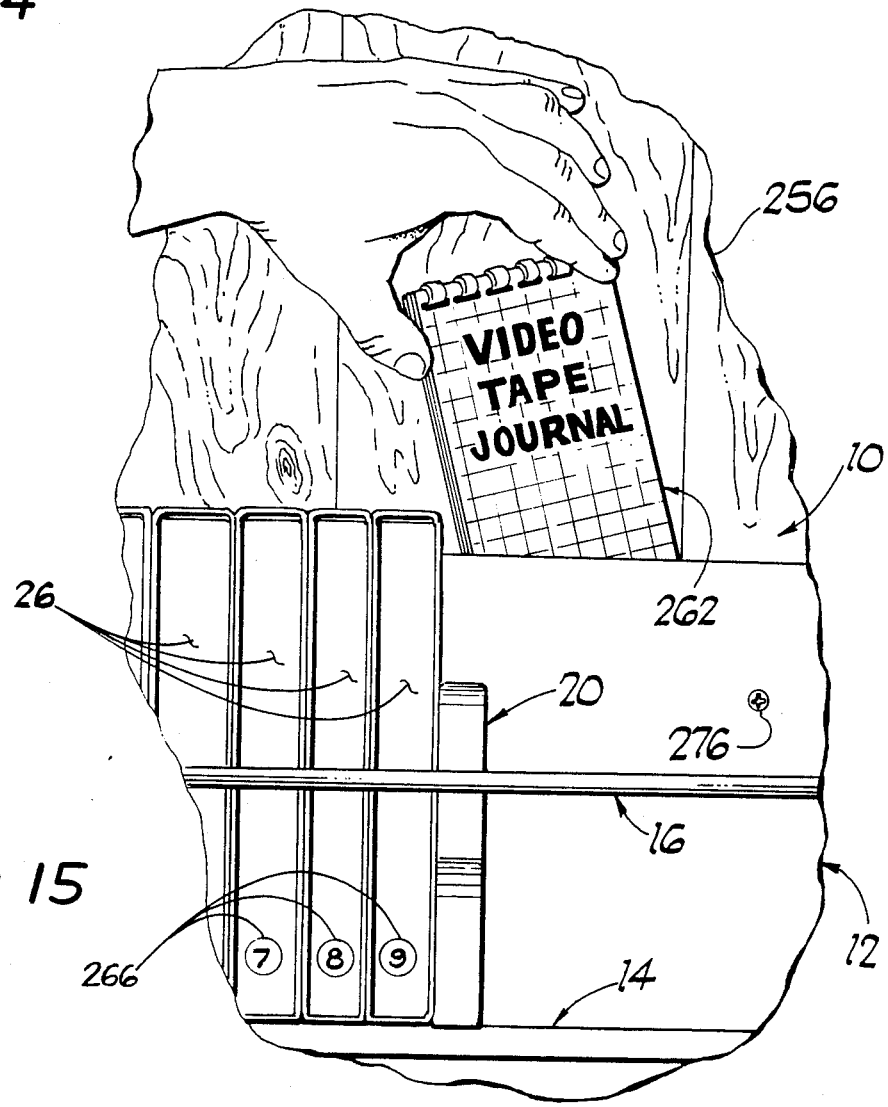
FIG. 15 is a relatively enlarged view of a fragmentary portion of the apparatus of FIG. 14 illustrating a particular feature thereof.

More particularly, and referring primarily to FIGS. 1, 13, 14 and 15, with the storage rack assembly 10 being mounted to suitable associated support structure 256, a journal-like book or index means 262 may be slidably inserted into and received within the pocket or recess 260a. As depicted in FIG. 14, when such journal means 262 is thusly received, the upper illustrated portion 264 thereof may well extend only to a height which is below the tops of the stored VCR tapes 26 which would, of course, enhance the overall appearance. As depicted in FIG. 15, the journal means 262 may be easily and slidably removed from the storage recess means 260a merely as by grasping the upper end thereof and lifting the journal means 262 from the recess means 260a.

Referring further to FIGS. 14 and 15, it can be seen that the various depicted VCR tapes 26 are provided with coded type indicia means 266 which, preferably, may take the form of self-adhesive numbered labels or the like. In the embodiment disclosed such indicia means 266 are respectively provided with sequential numbers (depicted as being 1–9). Such numbers (1–9) are then employed as index codes which are entered in the journal means 262 to therein indicate the subject matter recorded on the respective VCR tapes 26. Therefore, it makes it easy to select the particular VCR tape 26 desired, as for playback, by first looking in the journal means 262 for the desired subject matter and then withdrawing only the correspondingly coded VCR tape 26 from the storage rack means 10. Further, it is contemplated (and preferred) that the journal means 262 be visibly coded to the indicia means 266. More particularly, in the preferred form, the cover or some other readily visible portion of the journal means 262 as well as that visible portion of the indicia means 266 generally surrounding the respective code numbers (1–9 etc.) be of the same color as to thereby constitute an indexing set. For example, one such indexing set could have red as its unifying color. Such indexing set would then be employed as with a (for example) single storage rack assembly 10 and the recordings stored thereon. Another indexing set could have blue as its unifying color and it would then be employed as with a (for example) second single storage rack assembly 10 and the recordings stored thereon. Still other colors could be employed as unifying colors in respective other indexing sets. The effect of such would be that if, for example, three storage rack means 10 were employed to store recordings thereon, and if a "No. 7" VCR recording 26 were removed from each of the three storage rack means, there would be no confusion as to which of such removed "No. 7" VCR recordings was to be replaced into which of the three storage rack means 10. The proper one of the storage rack means 10 would become self-evident from the unifying color employed for that storage rack 10 in the indicia means 266 thereof. Further, by having the respective journal means 262 coded by the unifying color, if two or more journal means 262 were to be simultaneously removed from two or more storage rack means 10, the replacement of such journal means 262 into the recess of the proper storage rack means 10 would again be self-evident since the visible indicia 266 on the stored VCR recordings would indicate which color of journal means properly belongs to that particular storage rack means 10.

Throughout the description hereinbefore presented, reference is made to the fact that the mounting means 12 and/or storage rack means 10 is secured to suitable associated support structure 256. Such support structure may take various forms. For example, as generally depicted in FIGS. 14 and 15, such support structure 256 may actually comprise a portion of a wall structure of a room; further, the support structure 256 may comprise a door to, for example, a closet thereby enabling the storage rack means 10 to be mounted as onto the rear of such door thereby keeping the storage rack means 10, and the recordings carried thereby, out of sight whenever such assumed closet door is closed. Also, by way of further example, the support structure 256 may comprise a portion of a cabinet door so that if the storage rack 10 were to be mounted as to the rear side of it, the storage rack 10 and recordings carried thereby would also be out of sight when the assumed cabinet door is closed.

Figure 16:
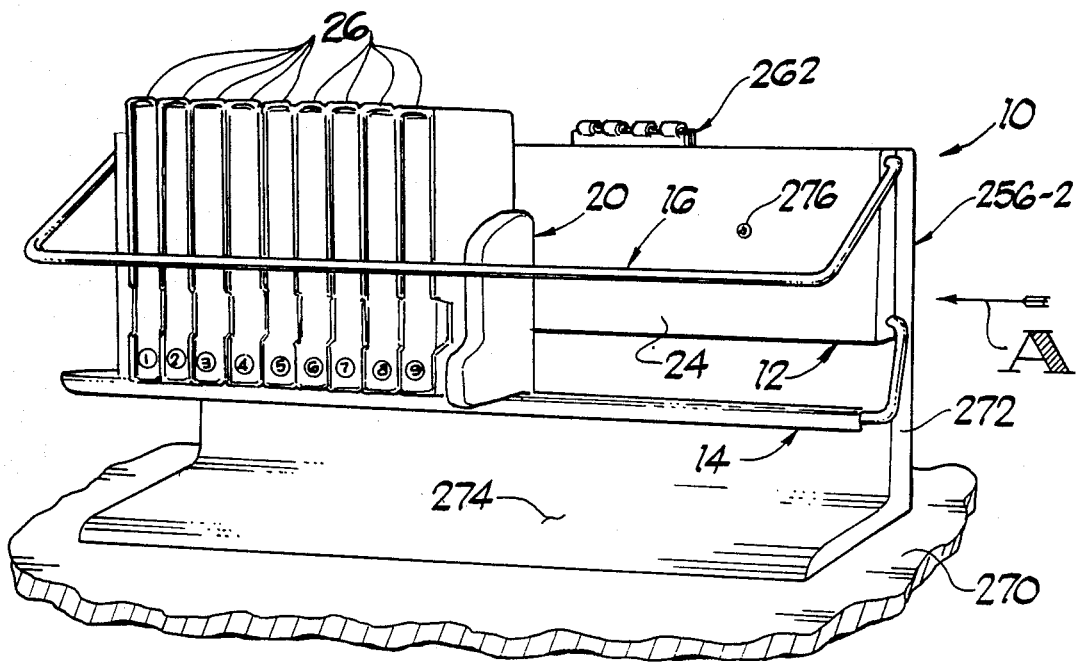
FIG. 16 is a view somewhat similar to that of FIG. 14 but illustrating the storage rack provided with its own support means.
Figure 17:
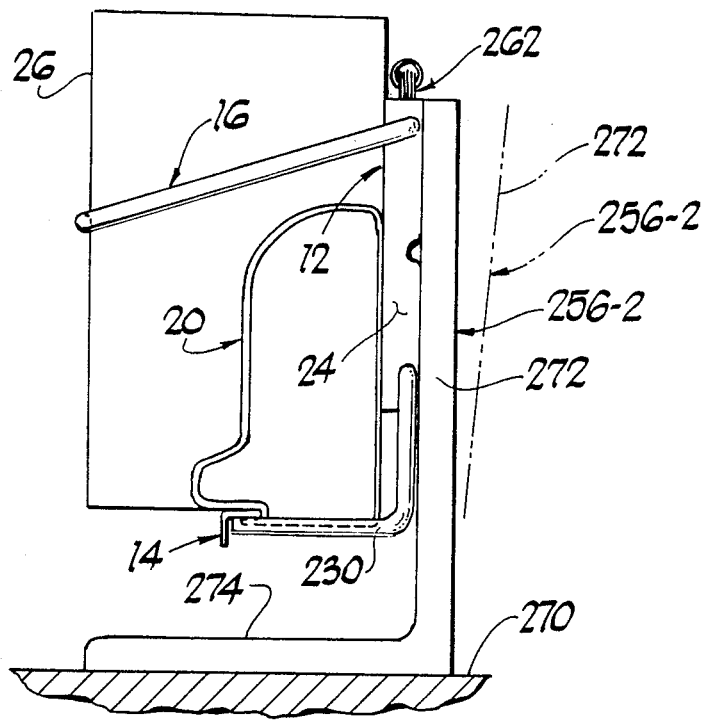
FIG. 17 is a relatively enlarged view taken generally in the direction of arrow A of FIG. 16.

The support structure 256 may take yet another form. For purposes of being able to more easily refer to such other form of support structure reference thereto will be made by reference number 256-2. Referring now in greater detail to FIGS. 16 and 17, the storage rack 10 may be suitably secured to support structure 256-2 as to thereby result in an overall free-standing storage structure which can be placed as atop a table, bench, shelf or any other suitable support surface means 270. Even though the support structure 256-2 may be of any suitable configuration and of any suitable material, as depicted, support structure 256-2 is formed of plastic material, such as ABS or high impact polystyrene, and molded as to have a relatively rearwardly disposed generally upwardly extending wall portion 272 integrally joined to a lower disposed generally laterally extending base or foot means or portion 274. In the embodiment of FIGS. 16 and 17 the length of vertical wall portion 272 is substantially equal to the length of the mounting means 12 (body sections 22 and 24 being assembled to each other). Also, the base 274 is depicted as being of continuous form of a length the same as that of vertical wall portion 272. The base 274, of course, may be made-up of spaced foot-like portions respectively situated as at or near the ends of the support structure 256-2 vertical wall portion 272. Further, the forward-most wall portion of the vertical wall 272 may have integrally molded extensions which are closely received as within any or all of blind holes 124, 126, 128, 136, 138 and 140 of body section 22 (FIGS. 3 and 4) and any or all of blind holes 140a, 138a, 136a, 128a, 126a and 124a of body section 24 (FIGS. 5 and 6) as to thereby readily locate the assembled body sections 22 and 24 against wall portion 272 while screws (such as 276) passing through the clearance passages 116 and 114 of body section 22 and clearance passages 114a and 116a of body section 24 serve to secure the mounting means 12, and elements carried thereby or connected thereto, to the generally vertically extending support wall portion 272. If desired, the support structure 256-2 may be formed as to have its mounting or support wall portion 272 significantly inclined to the vertical as generally depicted in phantom line in FIG. 17.

Figure 18:
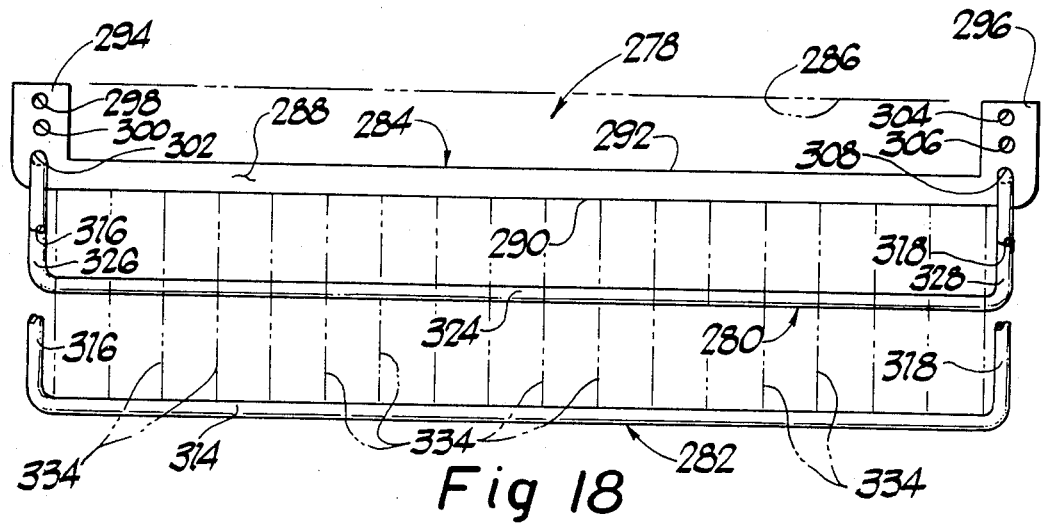
FIG. 18 is a top plan view of another form of storage rack employing teachings of the invention.
Figure 19:
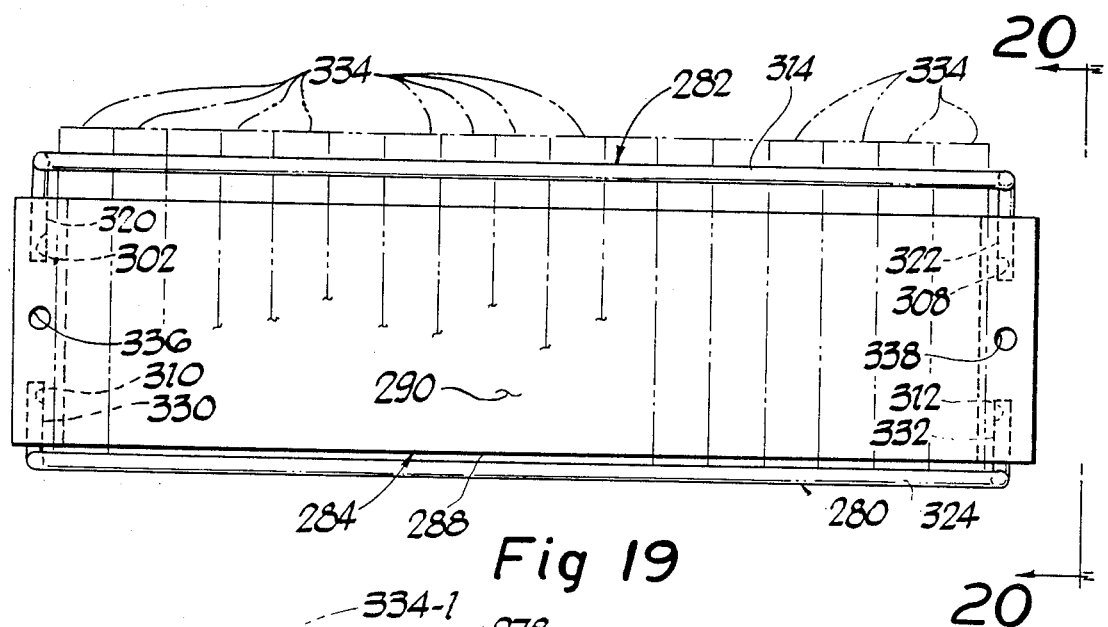
FIG. 19 is a front elevational view of the storage rack of FIG. 18.
Figure 20:
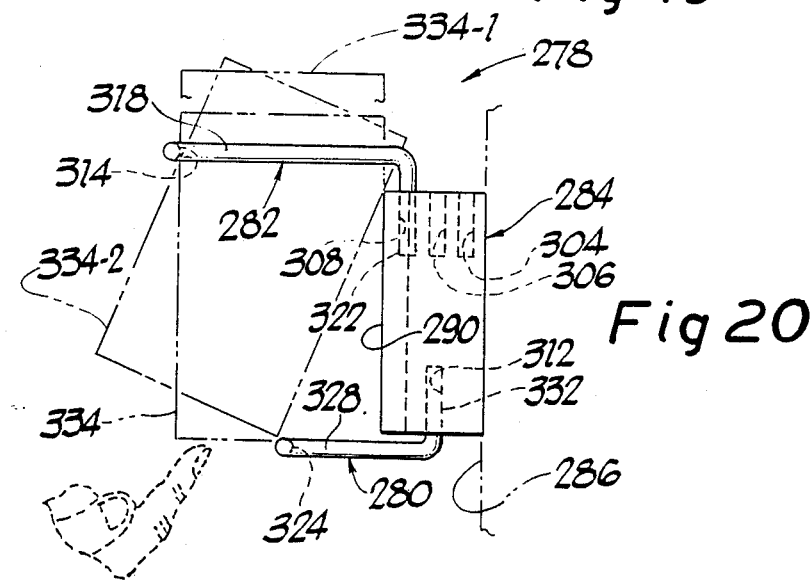
FIG. 20 is a view taken generally on the plane of line 20—20 of FIG. 19 and looking in the directions of the arrows.

FIGS. 18, 19 and 20 illustrate another form of the invention. In the embodiment of FIGS. 18, 19 and 20, the storage rack means 278 is illustrated as comprising a lower disposed bottom support means 280 and relatively upwardly situated retainer means 282 each operatively carried by a mounting means 284 which, in turn, when operatively employed, is suitably secured to associated support structure 286.

In the embodiment illustrated, the mounting means 284 is depicted as being of generally U-shaped configuration (as viewed in FIG. 18) having a longitudinally extending main body portion 288, with forwardly and rearwardly disposed surfaces 290 and 292, having leg-like rearwardly projecting end portions 294 and 296.

Rearwardly directed end portion 294 has formed therein a plurality of passages 298, 300 and 302 which may be blind passages not extending entirely through portion 294; similarly, rearwardly directed end portion 296 has formed therein a plurality of passages 304, 306 and 308 which also may be of the blind type. At the lower ends of the end portions 294 and 296 respective upwardly directed passages 310 and 312 are formed and such, too, may be of the blind type.

The upper disposed support or containment means 282 is preferably formed of cylindrical rod like metal and formed as to be in a U-shaped configuration (as viewed in FIG. 18) with a longitudinally extending bight portion 314 and oppositely disposed leg portions 316 and 318 which, in turn, respectively terminate in downwardly extending projections or free end portions 320 and 322.

Somewhat similarly, the lower disposed support means 280 is preferably formed of cylindrical rod like metal and formed as to be in a U-shaped configuration (as viewed in FIG. 18) with a longitudinally extending bight portion 324 and oppositely disposed leg portions 326 and 328 which, in turn, respectively terminate in upwardly extending projections or free ends 330 and 332.

All of such passages or blind holes 298, 300, 302, 304, 306, 308, 310 and 312 are preferably of a size as to provide for at least a close or slight interference fit with the various free end projections 320, 322, 330 and 332 when received therein.

In operation, the distance which longitudinally extending containment means or portion 314 extends away from the forward surface 290 of mounting means 284 is also adjustable. That is, downwardly depending free end portions 320 and 322 may be selectively respectively inserted into receiving passages 302 and 308 or 300 and 306 or 298 and 304 depending upon the physical size of the VCR recordings 334 to be contained between longitudinal portion 314 and mounting means 284.

The entire storage rack means 278 may be suitably secured to the associated support structure 286 as by screws (not shown) for which clearance passages 336 and 338 are formed through the end portions 294 and 296. The support structure 286 may take any of the forms as hereinbefore described, as at 256 and 256-2, with reference to FIGS. 1–17.

With the storage rack means 284 assembled (as described and as generally depicted) and secured to the associated support structure, any of the VCR recordings 334 may be selectively removed therefrom as by pushing the selected VCR recording generally directly upwardly, as to a position as depicted in phantom line at 334-1, and then lifting the VCR recording from the storage rack means 278, or, the bottom of the selected VCR recording may be swung generally forwardly as to a position depicted in phantom line at 334-2 and then slid generally downwardly and outwardly. Both of such methods of removal of selected VCR recordings have also been discussed with reference to FIG. 13.

Figure 21:
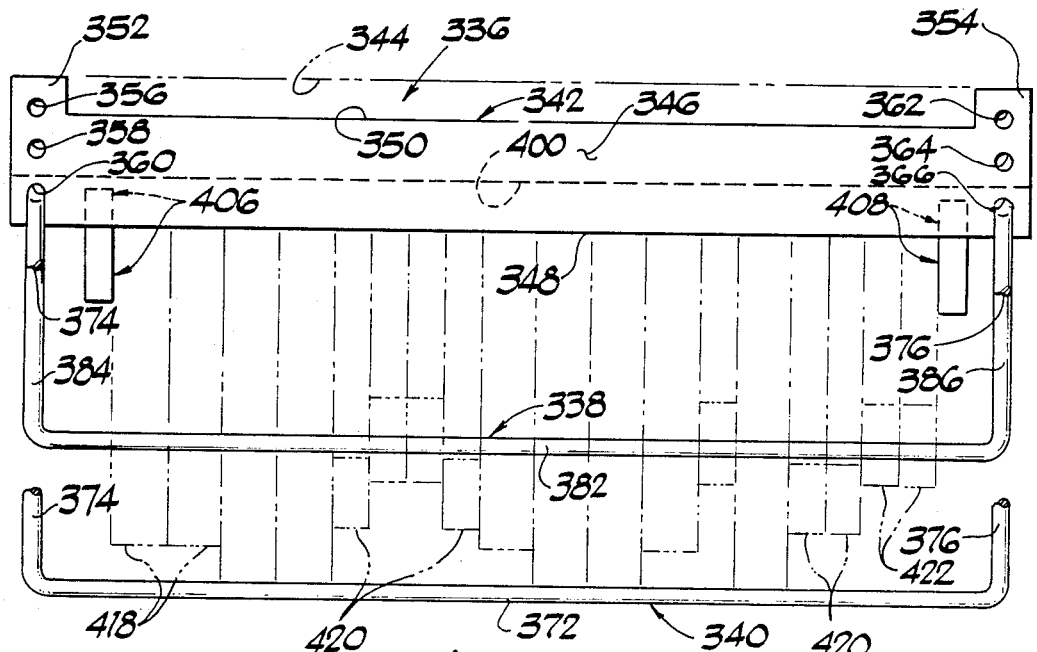
FIG. 21 is a top plan view of still another form of storage rack employing teachings of the invention.
Figure 22:
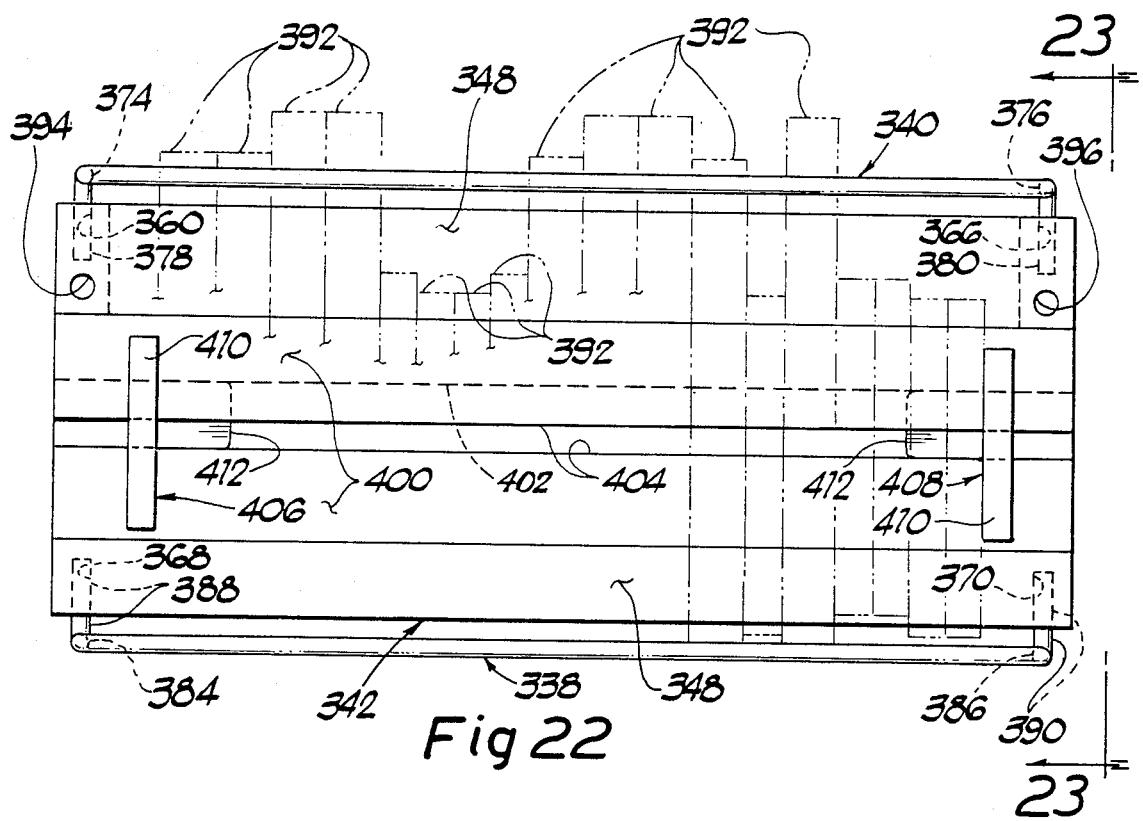
FIG. 22 is a front elevational view of the storage rack of FIG. 21.
Figure 24:
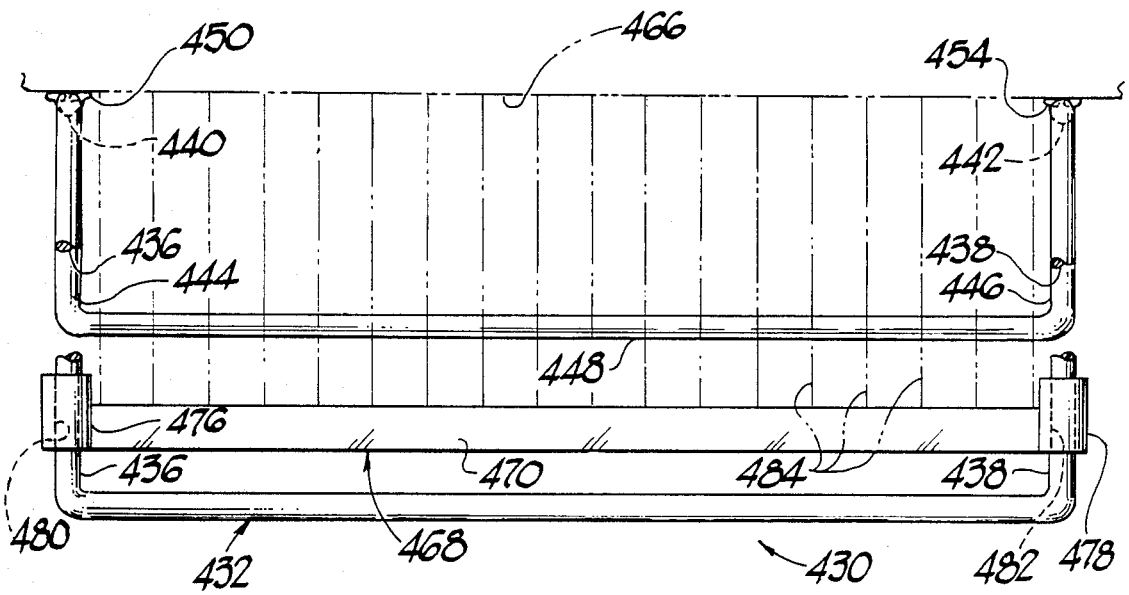
FIG. 24 is a top plan view of yet another form of storage rack employing teachings of the invention.
Figure 25:
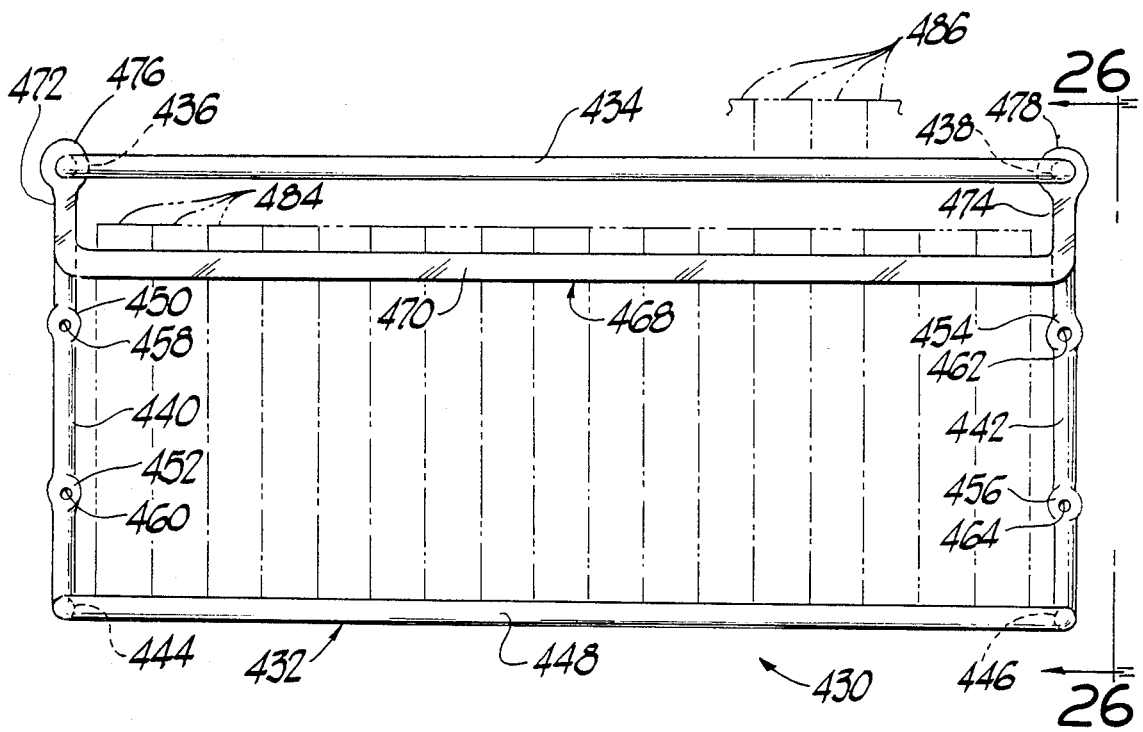
FIG. 25 is a front elevational view of the storage rack of FIG. 24.

FIGS. 21, 22 and 23 illustrate another form of the invention. In the embodiment of FIGS. 21, 22 and 23, the storage rack means 336 is illustrated as comprising a lower disposed bottom support means 338 and relatively upwardly situated retainer means 340 each operatively carried by a mounting means 342 which, in turn, when operatively employed, is suitably secured to associated support structure 344.

In the embodiment illustrated, the mounting means 336 is depicted as being of generally U-shaped configuration (as viewed in FIG. 21) having a longitudinally extending main body portion 346, with forwardly and rearwardly disposed surfaces 348 and 350, having leg-like rearwardly projecting end portions 352 and 354.

Rearwardly directed end portion 352 has formed therein a plurality of passages 356, 358 and 360 which may be blind passages not extending entirely through portion 352; similarly, rearwardly directed end portion 354 has formed therein a plurality of passages 362, 364 and 366 which also may be of the blind type. At the lower ends of the end portions 352 and 354 respective upwardly directed passages 368 and 370 are formed and such, too, may be of the blind type.

The upper disposed support or containment means 340 is preferably formed of cylindrical rod like metal and formed as to be in a U-shaped configuration (as viewed in FIG. 21) with a longitudinally extending bight portion 372 and oppositely disposed leg portions 374 and 376 which, in turn, respectively terminate in downwardly extending projections or free end portions 378 and 380.

Somewhat similarly, the lower disposed support means 338 is preferably formed of cylindrical rod like metal and formed as to be in a U-shaped configuration (as viewed in FIG. 21) with a longitudinally extending bight portion 382 and oppositely disposed leg portions 384 and 386 which, in turn, respectively terminate in upwardly extending projections or free ends 388 and 390.

All of such passages or blind holes 356, 358, 360, 362, 364, 366, 368 and 370 are preferably of a size as to provide for at least a close or slight interference fit with the various free end projections 378, 380, 388 and 390 when received therein.

In operation, the distance which longitudinally extending containment means or portion 372 extends away from the forward surface 348 of mounting means 342 is also adjustable. That is, downwardly depending free end portions 378 and 380 may be selectively respectively inserted into receiving passages 360 and 366 or 358 and 364 or 356 and 362 depending upon the physical size of the VCR recordings 392 to be contained between longitudinal portion 340 and mounting means 342.

The entire storage rack means 336 may be suitably secured to the associated support structure 334 as by screws (not shown) for which clearance passages 394 and 396 are formed through the end portions 352 and 354. The support structure 344 may take any of the forms as hereinbefore described, as at 256, 256-2 and 286, with reference to FIGS. 1-20.

Generally, it should now be apparent that, to the extent now described, there is similarity as between the forms of the inventions disclosed in FIGS. 18, 19 and 20 and FIGS. 21, 22 and 23. However, the differences therebetween will be better understood if, in particular, FIGS. 22 and 23 are further considered.

In the preferred embodiment of the form of the invention disclosed by FIGS. 21, 22 and 23, the frontal face or surface 348 is generally interrupted as by a longitudinally extending inclined surface 400 formed as into the mounting means 342. Further, longitudinally extending guide slot means 402 may also be formed into mounting means 342 and, as best seen in FIGS. 22 and 23, such guide means 402 may comprise a generally coextensive opening 404 formed into mounting means 342 and opening into the inclined surface 400.

A pair of end containment means or members 406 and 408 are operatively slidably contained by the guide means 402 and slidably movable therealong generally toward and away from each other. As typically illustrated by end containment means 408, each of such containment means is preferably comprised of a main body portion 410, a slide portion 412 and an interconnection 414. The slide portion 412 is guidingly slidably received within guide means 402 thereby, through the interconnection 414, enabling the end containment member bodies 410—410 to be selectively movable toward and away from each other and thereby be effective to engage the stored VCR tapes and assist in maintaining them in a generally vertically stored position.

In FIG. 22, the various stored recordings (shown in phantom line) are identified generically by the reference number 392 as VCR recordings. However, as best illustrated in FIG. 23, such VCR recordings are clearly depicted as being comprised of various types of recordings as, for example, a VHS recording 416, a Beta recording 418, a "C" format recording 420 and an 8 mm. recording 422. As will be evident from especially FIG. 23, the physical size of the "C" format 420 and 8 mm. 422, being considerably smaller than either the VHS 416 or Beta 418, are enabled to be leaned generally rearwardly as to have their respective rearward end surfaces abut against the inclined surface 400 thereby shifting the respective centers of gravity thereof further rearwardly of the lower support member 382. When thusly positioned, the end containment members 406 and 408 may be brought thereagainst further enhancing the stability of the stored recordings.

As in the form of the invention in FIGS. 18, 19 and 20, the upper support means 340 is also adjustable by selectively engaging the depending ends 378 and 380 into the available receiving holes 360, 366 or 358, 364 or 356, 362.

FIGS. 24, 25, 26 and 27 illustrate yet another form of storage rack employing teachings of the invention. Referring in greater detail to FIGS. 24-27, the storage rack 430 is depicted as comprising, in the main, a unitary structure comprised, for example, of a continuous cylindrical steel rod bent or formed as to provide for the various portions hereinafter described.

More particularly, the continuous rod 432 is depicted as having a longitudinally extending upper portion 434 with rearwardly extending support arm portions 436 and 438 which, in turn, are respectively downwardly (generally vertically) continued by mounting legs 440 and 442 which comprise mounting means. At the lower ends of legs 440 and 442 are respective forwardly extending arms 444 and 446 each of which are joined to a longitudinally extending lower support portion 448.

In the preferred form of the storage rack 430, the mounting means or legs 440 and 442 are formed as with indented or flatted portions 450, 452, 454 and 456 through which are respectively formed through holes or passages 458, 460, 462 and 464 for the reception therein of suitable screws (not shown), or the like, for mountingly securing the storage rack 430 to associated support structure 466. The support structure 466 may take any of the forms as hereinbefore described, as at 256, 256-2, 286 and 344, with reference to FIGS. 1-23.

The upper support arms 436 and 438 collectively slidably carry a longitudinally extending abutment member 468 which, as depicted, is preferably comprised of a main body portion 470 and opposite upwardly directed end portions 472 and 474. As shown in each of FIGS. 24-27, the respective upper ends of portions 472 and 474 are provided with what may be considered as enlargements 476 and 478 which, in turn, by means of passages 480 and 482 formed therein, receive upper arms 436 and 438 therethrough. The abutment member 468 in concert with coacting arms 436 and 438 serves as adjustable upper support means in holding the recordings, stored atop the lower support means 448, as against the frontal surface of the associated support structure 466. More particularly, referring to FIG. 26, if the recordings should be of relatively small physical size, as depicted in phantom line at 484, the abutment means 468 can be adjustably slid (along arms 436 and 438) toward the recording 484 until the longitudinal portion 470 thereof abuts against the forwardly disposed surface of recording 484. Also, if larger recordings are to be stored, as fragmentarily illustrated in phantom line at 486, the abutment means 468 can be slid to the left (as viewed in FIG. 26) until the position of longitudinal portion 470 accommodates the size of such recording 486. It should be noted that as depicted in FIG. 26 both the height and width of recording 486 are greater than that of recording 484; nevertheless, if the abutment means 468 were adjusted to accommodate the larger recording 486, the smaller recording 484 would still be retained in the storage rack 430 because the ends 472 and 474 extend sufficiently downwardly as to place the longitudinal abutment portion 470 within the path of movement should the smaller recording 484 (for some reason) be jarred forwardly toward portion 470.

The abutment means 468 may, of course, be made of any suitable material. However, in the preferred embodiment of the form disclosed, the abutment means 468 would be comprised of relatively rigid plastic material somewhat elastomerically deformable. That is, each of the enlargements 476 and 478, as typically depicted by 478 in FIG. 27, may be provided with a slot-like opening 490 which, when elastomerically pried further open permits the insertion therethrough of the cooperating arm (as 438 in FIG. 27) into the receiving passage (as 482 in FIG. 27).

In the embodiment of FIGS. 28-31 all elements which are like or similar to the elements of the embodiment of FIGS. 1-15 are, unless noted to the contrary, identified with like reference numbers. Referring to FIGS. 28-31 (and comparing such to the embodiment of FIGS. 1-15) it can be seen that the elongated body means 12, of assembly 500, not only comprises body sections or portions 22 and 24 but also comprises a third body portion or section 502 which, in the form illustrated, is of elongated configuration and suitably secured to the rearward portion of body sections 22 and 24 as by a plurality of screws two of which are depicted at 504 generally along the upper edge 505 thereof and two of which are depicted at 506 generally along the lower edge 507 thereof. As illustrated in both FIGS. 28 and 31, the body means 12 may be provided with suitable base means and in the embodiment disclosed such takes the form of a plurality of foot-like members 508 and 510 which may be suitably secured to the body section 502 of the body means 12 as by respective ones of the screws 506.

Although the practice of the invention is not so limited, in the embodiment of FIGS. 28-31, the upper swingable support 16 has its pivot portions 216 and 218 respectively received in journal passages 84 and 80a while the lower support 14 is depicted as having been moved (compared to FIG. 13) as to have its portions 232 and 234 respectively received in passages 82 and 82a.

As shown in FIGS. 28-31, the body section 502 is preferably provided, as at ends thereof, with locking or abutment means 512 and 514. As generally illustrated, the locking or abutment means 512 may comprise tab-like extensions 516 and 518 which cooperate in defining therebetween a slot-like recess or opening 520 with such opening 520 being of a size sufficient to receive at least a portion of upper swingable support 16 and, in particular, arm portion 214 thereof. Similarly, locking or abutment means 514 is illustrated as comprising tab-like extensions 522 and 524 which cooperate in defining therebetween a slot-like recess or opening 526 with such opening 526 being of a size sufficient to receive at least a portion of upper swingable support 16 as, for example, arm portion 212 thereof.

In view of the foregoing, it should be apparent that the inner situated surfaces 528 and 530 of the recess or slot 520 serve as abutment means or surfaces which, in turn, prevent the undesired rotation of arm 214 and upper swingable support 16 once arm 214 is operatively received by such slot or recess means 520 and, similarly, the inner situated surfaces 532 and 534 of the recess or slot 526 also serve as abutment means or surfaces which also prevent the undesired rotation of arm 212 and upper swingable support 16 once arm 212 is operatively received by such recess or slot means 526.

Figure 28:
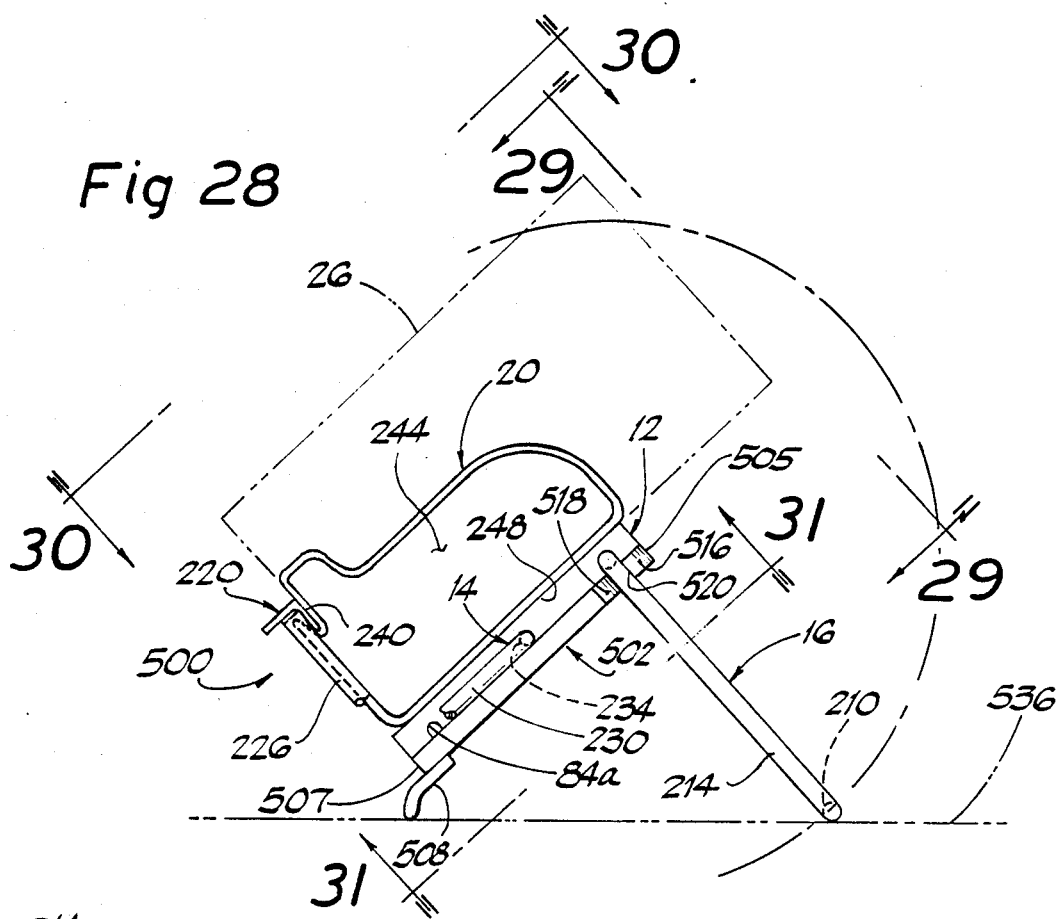
FIG. 28 is an end elevational view, somewhat similar to that of FIG. 13, but illustrating a modification of the invention.
Figure 31:
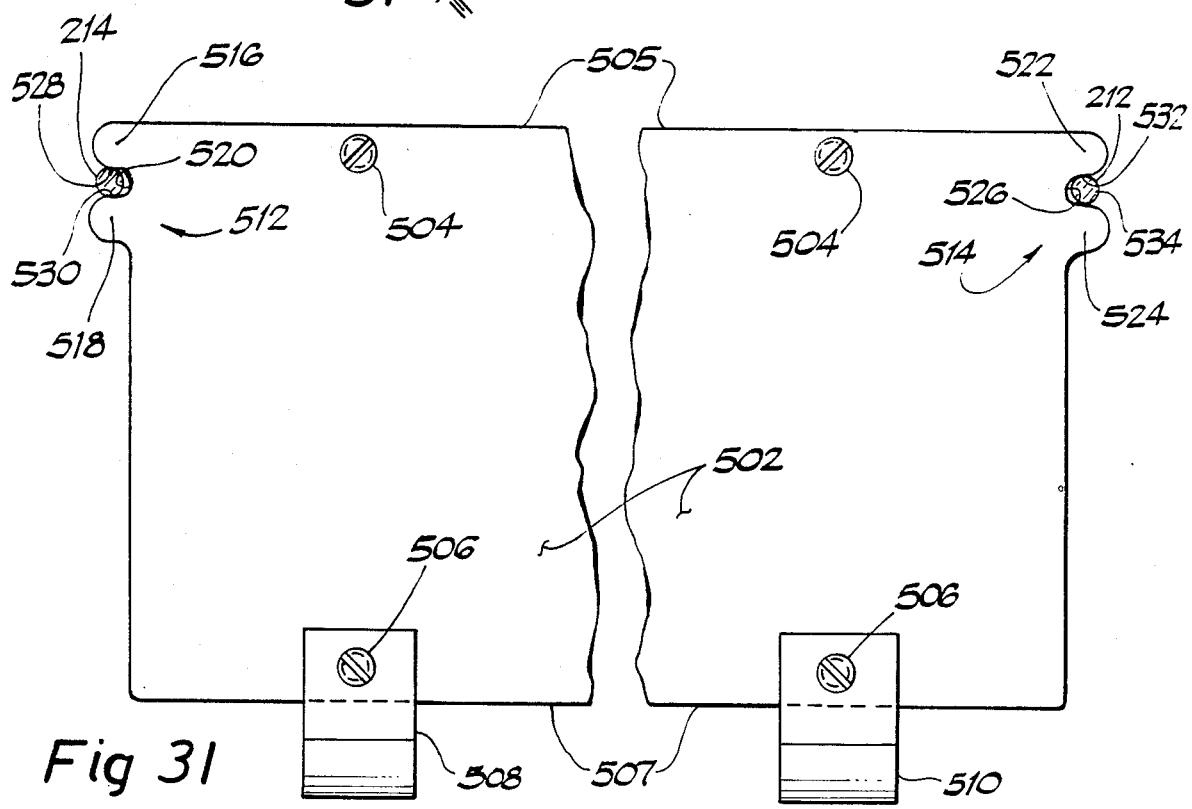
FIG. 31 is a view taken generally on the plane of line 31—31 of FIG. 28 and looking in the direction of the arrows.

By rotating the upper support means 16, as from any of its positions depicted in, for example, FIGS. 13, 14 or 17, to a position rearwardly of the rearwardly situated surface means of the body means 12 of FIG. 28, to the position as generally depicted in FIG. 28, as to thereby cause said upper support means 16 to be operatively locked or retained, in such FIG. 28 depicted position, by the locking or retaining means 512 and 514, the thusly repositioned upper support means 16 becomes at least a portion of a stand for supporting the entire assembly 500 as on and atop a related or associated support surface 536 (which may be, for example, an item of furniture). As a consequence thereof, the consequently rotated body means 12 is significantly inclined with respect to the horizontal and the recordings and the like 26, supported by the lower support means 14 no longer need to be doubly forwardly supported by the upper support means 16 as in the situation described with reference to, for example, FIG. 13.

This then enables the assembly 500 to be employed in the manner described as with reference to, for example, FIGS. 1-14 or to be employed as a free-standing storage rack 500 as depicted in FIGS. 28, 29 and 30.

FIGS. 32-38 illustrate still another embodiment of the invention. As will become apparent, the storage rack assembly 538 is in many respects similar to the embodiments of FIGS. 1-13 and FIGS. 28-31.

Figure 32:
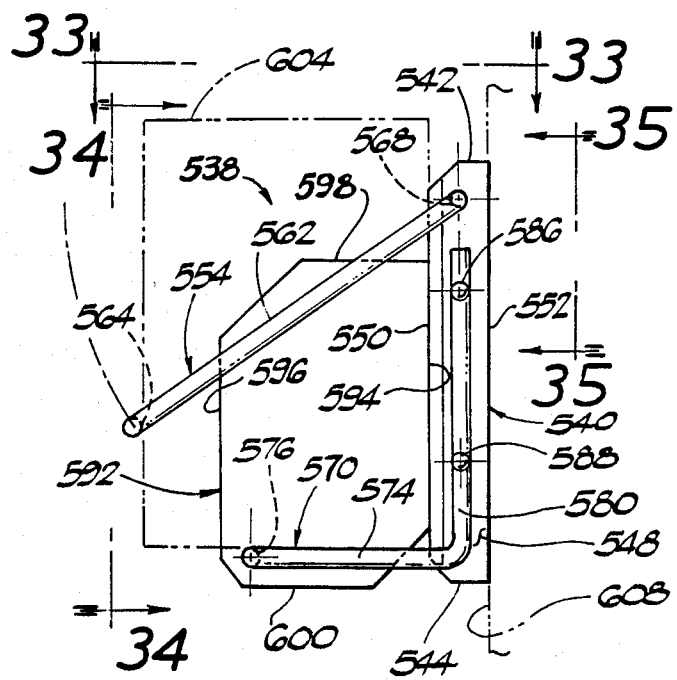
FIG. 32 is an end elevational view, also somewhat similar to that of FIG. 13, but illustrating a further modification of the invention.

Referring in greater detail to FIGS. 32-38, the storage rack assembly 538 is depicted in FIG. 32 as in an operational position equivalent to that depicted in, for example, FIG. 13. The mounting means or main body means 540 (functionally similar to body means 12) is generally elongated having upper elongated surface or edge means 542 and lower elongated surface or edge means 544. The body means 540 also comprises relatively short body end surface or edge means 546 and 548 as well as forwardly and rearwardly situated surface means 550 and 552.

A relatively upper disposed support means 554 (functionally similar to, for example, 16 of FIGS. 1-13 and to 16 of FIGS. 28-32) is pivotally carried by body or mounting means 540. More particularly, in the preferred embodiment of the structure of FIGS. 32-38, the main body means 540 carries longitudinally oppositely situated journal means 556 and 558, which may be formed into body means 540 and which pivotally support the upper support means 554. Further, in the preferred embodiment, the upper disposed swingable support means 554 is formed in a generally U-shaped configuration comprising legs 560 and 562, joined as by an elongated bight portion 564, and having pivot portions 566 and 568 respectively journalled in journal or bearing means 556 and 558.

A relatively lower disposed support means 570 (functionally similar to, for example, 14 of FIGS. 1–17, to 282 of FIGS. 18–20 and to 338 of FIGS. 21, 22 and 23) is generally fixedly carried by body means 540. In the preferred embodiment, the lower support means 570 is formed in a generally U-shaped configuration comprising generally horizontally extending legs 572 and 574, joined as by an elongated bight portion 576, and respectively having generally upwardly directed leg-like extensions 578 and 580. The lower support means 570 may be secured to body means as by, for example, a first plurality of suitable fastener means 582 and 584 passing through leg extension 578 and into body means 550 and a second plurality of suitable fastener means 586 and 588 passing through leg extension 580 and into body means 550.

Further, in the preferred embodiment of the apparatus of FIGS. 32–38, the storage rack assembly 538 is provided with slidably adjustable end containment means or members 590 and 592 (respectively functionally equivalent to, for example, 18 and 20 of FIGS. 1 and 2). As typically illustrated by containment member 592 each of such containment members may be comprised of a body portion having a relatively inward (or rearward) edge surface 594, a relatively outward (or forward) edge surface 596 and relatively upper and lower edge surfaces 598 and 600, respectively. Each of the containment members 590 and 592 is also preferably provided with an aperture or passage 602 formed therethrough as to slidably receive therein, and therethrough, the bight portion 576 of lower support means 570.

Figure 33:
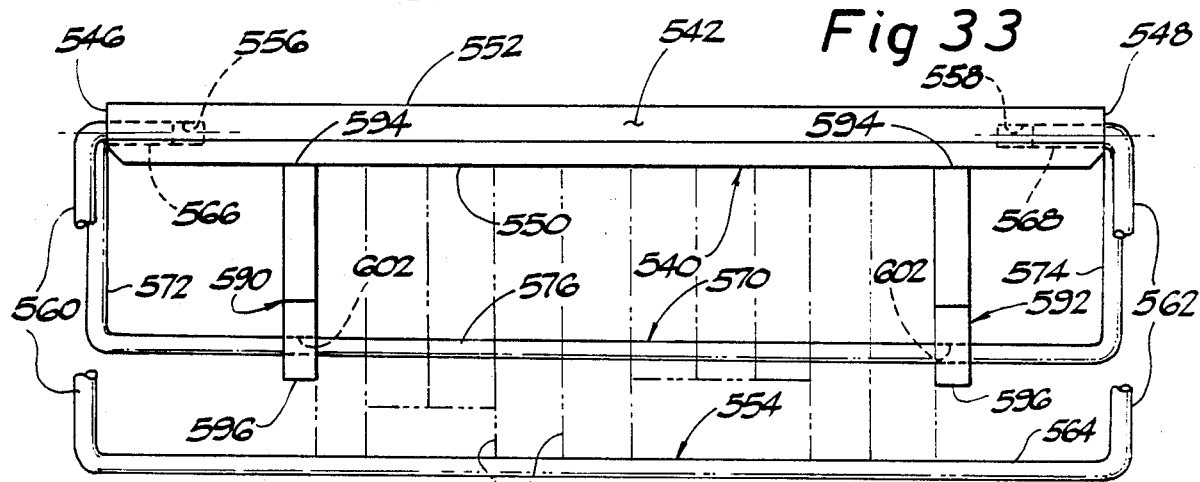
FIG. 33 is a view taken generally on the plane of line 33—33 of FIG. 32 and looking in the direction of the arrows.
Figure 34:
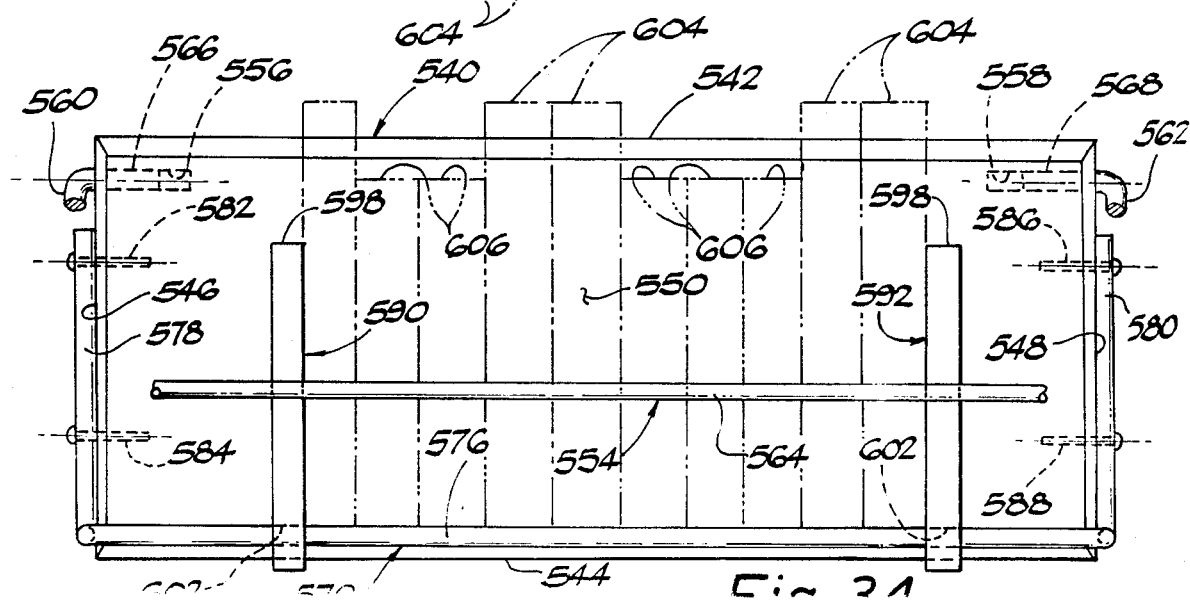
FIG. 34 is a view taken generally on the plane of line 34—34 of FIG. 32 and looking in the direction of the arrows.

The operation of the storage rack assembly 538, as thus far disclosed in FIGS. 32, 33 and 34, is generally equivalent to that of the storage rack assembly 10 of FIGS. 1–13. As should now be evident, the various recordings and the like, as at 604 and 606, are generally vertically supported by the lower support means 570 (and in particular the bight portion 576 thereof) and contained as against the forwardly situated surface means 550 as by the bight portion 564 of the upper support means 554. The entire storage rack assembly 538 is shown in FIG. 32 as being supported as by associated support means 608 which may be the same or functionally equivalent to any of the support means 256, 256-2, 272, 344 or 466 previously disclosed and described.

Figure 35:
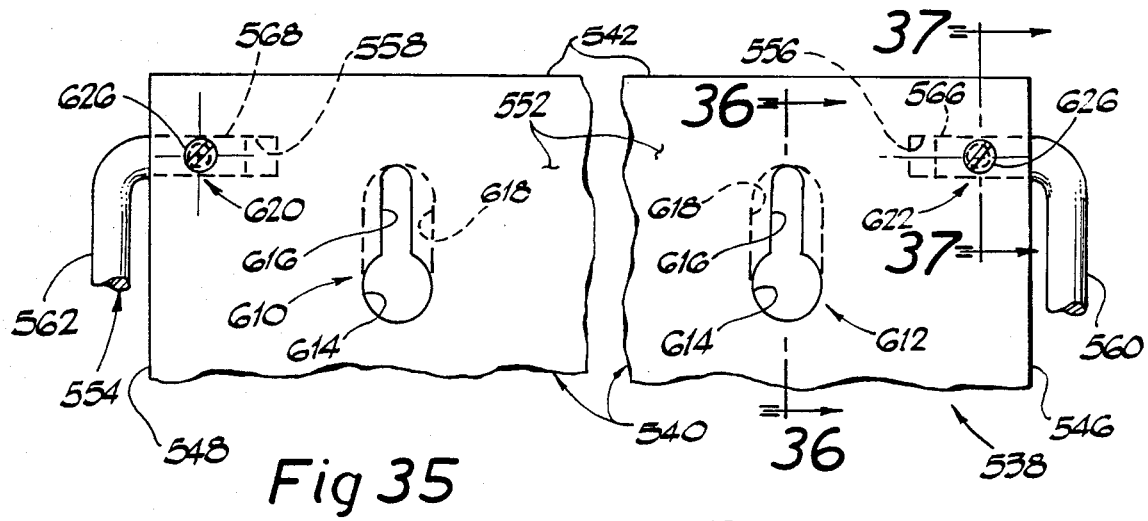
FIG. 35 is a fragmentary view with portions thereof broken-away, in relatively enlarged scale, taken generally on the plane of line 35—35 of FIG. 32 and looking in the directions of the arrows.

One manner of achieving operative connection between the storage rack assembly 538 and the associated support structure 608 is illustrated in FIG. 35. In particular, in the preferred embodiment, a pair of T-type slots or recesses 610 and 612 are formed in body means 540. Typically, each of such slots or recesses 610 and 612, comprise a relatively large counterbore portion 614 and a relatively narrow slot-like opening 616 extending therefrom. Generally inwardly of surface 552, and as the end of counterbore 614, an enlarged somewhat elongated chamber 618 is formed which may be of a width generally equal to the diameter of counterbore 614 and extending as for the length of slot 616. As will be apparent, such T-slot recesses 610 and 612 serve as detachable latching means. That is, by way of example, the support structure 608 may be provided as with a pair of screws (not shown) secured therein in a manner whereby the heads of the respective screws would be spaced some distance from the surface of support structure 608. The storage rack assembly 538 would then be operatively mounted to the associated support structure by first permitting the respective screw heads to pass into counterbores 614 (of 610 and 612) and then lowering the rack assembly 538 thereby causing the exposed portions of the shanks of the screws to respectively slide through slots 616 (of 610 and 612) while simultaneously trapping or containing the respective screw heads within chambers 618 (of 610 and 612).

Figure 38:
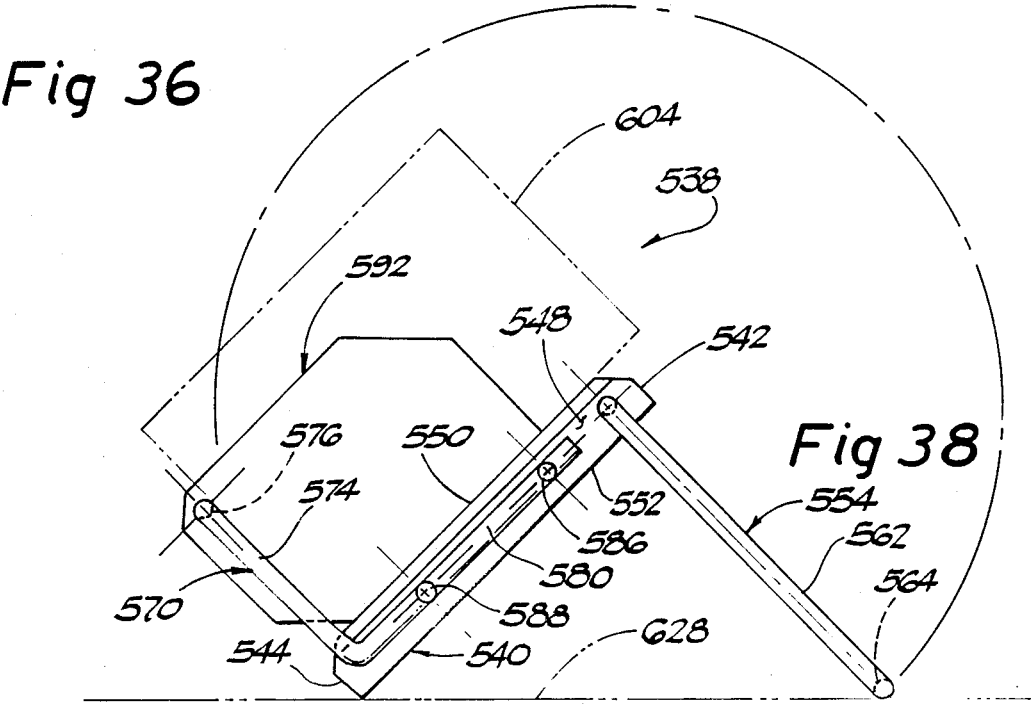
FIG. 38 is an end elevational view of the structure of FIGS. 32-37, but shown in a different mode of utility or operation as compared to FIG. 32.

In the embodiment of FIGS. 32–38 means are provided for enabling the storage rack assembly 538 to be employed in a manner as depicted in FIG. 32 (that is, being mounted onto an associated support structure 608) or to be employed as a free-standing storage rack assembly as depicted in FIG. 38 so as to exhibit a function generally equivalent to the embodiment as disclosed in FIGS. 28–31. In order to provide such abilities and characteristics, in the preferred embodiment of the storage rack assembly 538 of FIGS. 32–38, latching, retaining or stop means are provided for selectively stopping the rotation of the upper support means 554 and to maintain such in a selected fixed attitude with respect to the body means 540.

Figures 36, 37:
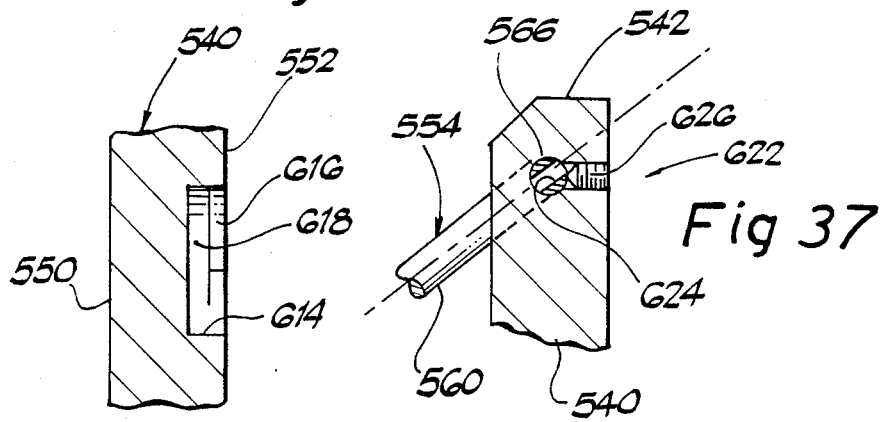
FIG. 36 is a fragmentary cross-sectional view taken generally on the plane of line 36—36 of FIG. 35 and looking in the direction of the arrows.
FIG. 37 is a fragmentary cross-sectional view taken generally on the plane of line 37—37 of FIG. 35 and looking in the direction of the arrows.

In the preferred embodiment of storage rack assembly 538 such latching means or stop means are provided as at 620 and 622 of FIG. 35. As typically illustrated by 622 of FIG. 37, each such stop means or retainer means 620 and 622 may comprise a recess or passage 624, formed through each of the pivot portions 566 and 568 of the upper support means 554, and cooperating keying means 626, such as a screw or the like, which can be operatively carried as by the body means 540. When the keying or locking means 626—626 are not operatively engaged with pivot portions 566 and 568, the upper support means 554 is free to rotate within the coacting journals 558 and 556. However, when the upper support means 554 is rotated as to present the recess or passage 624 to the locking members 626, such locking members 626 may be moved inwardly (toward the pivot portions) and pass into or otherwise operatively engage the recess or passages 624 and fixedly secure the upper support means 554 against undesired further relative rotational movement. As shown in FIG. 37, the axis of passage 624 is generally parallel to the axis of the arms 560 and 562 of support means 554. However, the practice of the invention is not so limited and the axial relationship may be any found suitable to the particular situation. Further, the passages 624, although preferred, may nevertheless, be replaced as by other suitable abutment means as, for example, suitable flatted areas on the pivot portions 566 and 568 against which the screw or keying members 626—626 could be brought into abutting engagement. In view of the disclosure herein made other means for selectively generally fixedly establishing a relationship as between the body means 540 and upper support means 554 will become apparent.

In any event, with the storage rack assembly 538 now assumed to be removed from its associated support means 608 of FIG. 32, the upper support means 554 can be rotated first generally upwardly, from its position depicted in FIG. 32, until the bight portion 564 thereof passes above the top of main body means 540, and then continued to be rotated generally downwardly behind the rearwardly situated surface means 552 (of main body means 540) until it reaches a position relative to main body means 540 as generally depicted in FIG. 38. At that time the keying or locking means 626—626 are moved into a locking or abutting relationship with the cooperating surface means of the locking passages or abutment means 624—624 as to hold such upper support means 554 from further undesired rotation and maintain it in the depicted resulting selected relationship with respect to main body means 540. Consequently, the upper support means 554 thereby changes its function from holding the recordings and the like 604 against the forward surface 550 of main body 540 to becoming a portion of a stand or support for maintaining the entire storage rack assembly 538 as free-standing unit or assembly as atop an associated support 628 which may be an item of furniture. When thusly set onto a support 628, as a free-standing assembly 538, the consequently rotated body means 540 is significantly inclined with respect to the horizontal and the recording and the like (604 and 606) supported by the lower support means 570 no longer need to be doubly forwardly supported by the upper support means 554 as in the situation described with reference to, for example, FIG. 32 (or FIG. 13).

This then enables, as previously generally indicated, the assembly 538 to be employed in the manner described as with reference to FIG. 32 (similarly to that described with reference to FIGS. 1–14) or to be employed as a free-standing storage rack as depicted in FIG. 38.

In view of FIG. 38, it should be apparent that if desired suitable cushioning or padding means may be provided at the lower portion of main body 540 and as at the bight portion 564 of means 554 as to inhibit, for example, undesired scratching of the support surface 628 and inhibit undesired sliding of the assembly 538 along such support surface 628.

FIG. 39 illustrates an arrangement whereby two or more of the storage rack assemblies 538, when in an operating configuration as depicted in FIG. 38, can be operatively connected to each other in a gang-like configuration or pattern.

In FIG. 39 the two storage rack assemblies may be considered as being substantially identical to each other and to the storage rack assembly 538 of FIG. 38. Therefore, the various elements and/or details of one of such storage rack assemblies of FIG. 39 employ the same reference numbers corresponding to the details and/or elements shown in FIG. 38; however, for clarity and ease of description, the other of the storage rack assemblies of FIG. 39 employs the same reference numbers followed by a "-1". Further, even though the specific locking or latching means, as for example, 620, 622 and 626 of FIGS. 35, 36 and 37, are not specifically shown in FIG. 39, it is to be assumed that such locking or latching means, or the equivalents thereof, are provided in the storage rack assemblies 538 and 538-1 of FIG. 39.

Referring in greater detail to FIG. 39, forwardly situated base, support or stand-like members 630 and 632 are provided as to respectively support the lower corner-like portions of body means 540 and 540-1, respectively, as defined, generally by the intersection of surfaces or edges 544 and 552 of body means 540 and by the intersection of surfaces or edges 544-1 and 552-1 of body means 540-1.

As typically depicted by member 630 in FIGS. 39 and 40, each of such supports or members 630 and 632 may comprise an elongated body 634 of a length preferably equal to the length of the body means 540 (or 540-1) and having side surfaces 636 and 638, end surfaces 640 and 642 and lower or bottom surface 644. The upper-most surface of each of the members 630 and 632 is contoured, preferably in a V-like configuration, to define a resting or cradling surface 646 for respectively receiving therein the previously described lower-most portions of body means 540 and 540-1.

Each of the bases 630 and 632 may be provided with foot-like or pad-like means 648 and 650 which may be comprised of non-scratching material such as, for example, rubber. In the embodiment of FIGS. 39 and 40, such pads 648 and 650 are, in turn, respectively provided with counterbores 652 and 654 and passages 656 and 658. Suitable securing means such as, for example, screws 660 and 668 may be used to secure the pads 648 and 650 to the base 630 (and base 632) and in so doing the respective screw heads 670 and 672 are received within the counterbores 652 and 654.

In the preferred embodiment, the storage rack assembly 538 (FIG. 39) is operatively connected to storage rack assembly 538-1 as via upper support means 554 and base or stand 632. That is, in the preferred arrangement, journal-like clips or retainers, which are secured to stand 632, generally circumferentially contain the bight portion 564 of support means 554. One form of such clip or retainer means 674 is illustrated, in relatively enlarged scale, in FIGS. 41 and 42 as comprising a somewhat U-shaped body having leg-like portions 676 and 678 which are joined at their respective one ends by a generally arcuate portion 680. Passages or clearance apertures 682 and 684 are respectively formed through legs 676 and 678 as depicted in FIG. 42. The retainer means 674 is comprised of any suitable material, preferably having spring-like characteristics, so that the legs 676 and 678 may be moved toward and against each other and in so doing effectively close the arcuate portion 680 and bring the clearance apertures 682 and 684 into registry with each other.

In the embodiment contemplated in FIG. 39, a retainer 674 would be employed in combination and cooperation with each of the pad means 648 and 650. More particularly, both of such retainers 674 would be placed about the bight portion 564 (of support means 554) as to have such bight portion 564 passing through the generally arcuate opening defined by the arcuate portion 680. Then the legs 676 and 678 would be squeezed together, respectively placed generally between the underside 644 of the base 632 and the pads 648 and 650 and then the fasteners 660 and 668 would be inserted through the clearance apertures 682 and 684 and into securing engagement with base or stand 632 resulting in a configuration as generally illustrated in FIG. 39. Even though only two storage rack assemblies are depicted in FIG. 39, such a means for connection, as described, may be employed for operatively connecting any number of storage rack assemblies into a gang arrangement.

Still with reference to FIG. 39, it is preferred that suitable cushioning means or the like be provided for the last (in the series) of the connected storage rack assemblies. In the embodiment of FIG. 39, this is accomplished as by providing one or more, preferably resilient, annular members 690 situated on and about the bight portion 564-1 of support means 554-1. Although various materials may be employed, in the preferred embodiment such an annular member (or members) 690 would be comprised of rubber.

Referring now to FIG. 38, it should be apparent that the single storage rack assembly 538 shown therein could be provided with a stand-like means 630 and foot portions 648 and 650 (as disclosed with reference to FIGS. 39 and 40) to provide a "non-scratching" support for the lower portion of body means 540 and that the bight portion 564 could be provided with an annular member (or members) 690 in a manner and for purposes as described with reference to bight portion 564-1 of FIG. 39.

Although only a preferred embodiment and a select number of other forms of the invention have been disclosed and described, it is apparent that other embodiments and modifications of the invention are possible within the scope of the appended claims.

What is claimed is:

1. A storage rack for the storage of recordings and the like, comprising mounting means, said mounting means comprising elongated body means having opposed upper and lower relatively long body side edges and opposed first and second relatively short body end edges, said elongated body means further comprising opposed relatively rearwardly and forwardly situated surface means, wherein said forwardly situated surface means extends for at least most of tee distance between said upper and lower relatively long body side edges and extends for at least most of the distance between said first and second relatively short body end edges, relatively upper disposed upper support means carried by said mounting means, wherein said upper support means comprises a first U-shaped member of a generally U-shaped configuration having a first bight portion joining spaced first and second legs, first journal means carried by said elongated body means and situated at said first relatively short body edge generally between said rearwardly and forwardly situated surface means, second journal means carried by said elongated body means and situated at said second relatively short body edge generally between said rearwardly and forwardly situated surface means, wherein said first leg comprises a first pivot portion connected to said first journal means, wherein said second leg comprises a second pivot portion connected to said second journal means, wherein with said first and second pivot portions being connected to said first and second journal means said first bight portion is situated forwardly of said forwardly situated surface means, relatively lower disposed lower support means carried by said mounting means, wherein said lower support means comprises a second U-shaped member of a generally U-shaped configuration having a second bight portion joining spaced third and fourth legs, wherein said third and fourth legs are connected to said elongated body means as to maintain said second bight portion in a fixed position relative to said elongated body means, wherein when in said fixed position said second bight portion is situated relatively forwardly of said forwardly situated surface means, wherein said first U-shaped member is pivotally swingable about said first and second journal means, wherein said first and second legs are each of a length whereby said first U-shaped member is pivotally swingable upwardly to an upper-most position whereat said first bight portion attains an elevation substantially above the elevation of said upper relatively long body side edge, wherein said first and second legs are each of a length whereby when said first U-shaped member is pivotally swung from said upper-most position and toward a lower-most position(forwardly of said forwardly situated surface means said first bight portion traverses a position which is disposed forwardly of said forwardly situated surface means a distance substantially greater than the distance by which said second bight portion is disposed forwardly of said forwardly situated surface means, wherein said second bight portion is effective for providing generally upward support to such recordings and the like as are placed thereatop, wherein when said first U-shaped member pivotally swings downwardly and forwardly of said forwardly situated surface means said lower-most position is determined by the engagement of said first bight portion with at least certain of such recordings and the like as are placed atop said second bight portion thereby having said first bight portion form a gate-like retainer generally containing said recordings and the like as are placed atop said second bight portion between said first bight portion and said forwardly situated surface means and maintaining said recordings and the like atop said second bight portion, wherein said first U-shaped member is also positionable as to cause said first bight portion to be disposed generally rearwardly of said relatively rearwardly situated surface means, and position holding means, said position holding means serving to hold said first U-shaped member in a selected position extending generally rearwardly of said relatively rearwardly situated surface means to thereby result in said first bight portion serving as a stand-like portion for vertically supporting said elongated body means upon associated support surface means.

2. A storage rack according to claim 1 wherein said position holding means comprises retainer means carried by said elongated body means.

3. A storage rack according to claim 2 wherein said retainer means comprises abutment means carried by said elongated body means for abutably engaging said first U-shaped member.

4. A storage rack according to claim 2 wherein said retainer means comprises slot-like recess means carried by said elongated body means, and wherein said slot-like recess means lockingly receives therein a portion of at least one of said first and second legs of said first U-shaped member.

5. A storage rack according to claim 2 wherein said retainer means comprises a securing member carried by said elongated body means and engageable with at least one of said first and second pivot portions of said first U-shaped member to thereby prevent free rotation of said first and second pivot portions relative to said elongated body means.

6. A storage rack according to claim 1 wherein said position holding means comprises tab-like means carried by said elongated body means and engageable with said upper support means.

7. A storage rack according to claim 6 wherein said tab-like means comprises a plurality of tab-like portions carried by said elongated body means and extending beyond said first relatively short body end edge.

8. A storage rack according to claim 7 wherein said plurality of tab-like portions comprise first and second tab-like portions, wherein said first and second tab-like portions are spaced from each other, and wherein said first and second tab-like portions are effective for respectively engaging one of said first and second legs at generally opposite sides thereof.

9. A storage rack according to claim 6 wherein said tab-like means comprises a plurality of tab-like portions carried by said elongated body means and extending beyond said first and second relatively short body end edges.

10. A storage rack according to claim 9 wherein said plurality of tab-like portions comprises a first plurality of tab-like portions and a second plurality of tab-like portions, wherein said first plurality of tab-like portions is carried by said elongated body means as to extend beyond said first relatively short body end edge, wherein said second plurality of tab-like portions is carried by said elongated body means as to extend beyond said second relatively short body end edge, wherein said first plurality of tab-like portions comprise first and second tab-like portions, wherein said first and second tab-like portions are spaced from each other, wherein said first and second tab-like portions are effective for respectively engaging one of said first and second legs at generally opposite sides thereof, wherein said second plurality of tab-like portions comprise third and fourth tab-like portions, wherein said third and fourth tab-like portions are spaced from each other, and wherein said third and fourth tab-like portions are effective for respectively engaging the other of said first and second legs at generally opposite sides thereof.

11. A storage rack according to claim 9 wherein said first and second journal means are situated generally between said forwardly situated surface means and said tab-like means.

12. A storage rack according to claim 2 wherein said retainer means comprises securing means carried by said elongated body means and engageable with at least one of said first and second pivot portions of said first U-shaped member to thereby prevent undesired rotation of said U-shaped member relative to said elongated body means.

13. A storage rack according to claim 12 wherein at least one of said first and second pivot portions carries abutment surface means, and wherein said securing means when preventing said undesired rotation of said U-shaped member is in operative engagement with said abutment surface means.

14. A storage rack according to claim 13 wherein said abutment surface means comprises recess-like surface means, and wherein said securing means is engageable with said recess-like surface means.

15. A storage rack according to claim 13 wherein said abutment surface means comprises a passage formed in said at least one of said first and second pivot portions, and wherein said securing means comprises a key-like locking member receivable by said passage.

16. A storage rack according to claim 2 wherein said retainer means comprises securing means carried by said elongated body means and engageable with said first and second pivot portions of said first U-shaped member to thereby prevent undesired rotation of said U-shaped member relative to said elongated body means, wherein said first pivot portion carries first abutment surface means, wherein said second pivot portion carries second abutment surface means, wherein said first abutment surface means comprises first recess-like surface means, wherein said second abutment surface means comprises second recess-like surface means, wherein said securing means comprises first and second screw members, wherein said first screw member is effective for engaging said first recess-like surface means, and wherein said second screw member is effective for engaging said second recess-like surface means.

17. A storage rack according to claim 16 wherein said first recess-like surface means comprises a first passage formed in and transversely of said first pivot portion, wherein said second recess-like surface means comprises a second passage formed in and transversely of said second pivot portion, and wherein said first and second screw members are respectively at least partially received by said first and second passages.

18. A storage rack according to claim 1 and further comprising intermediate support means situated between said lower relatively long body side edge and said associated support surface means.

19. A storage rack according to claim 18 wherein said intermediate support means is separable from said elongated body means, and wherein said intermediate support means comprises cradle-like surface means for receiving therein at least a portion of said lower relatively long body side edge.

20. A storage rack according to claim 1 and further comprising cushion-like means situated generally between said first bight portion and said associated support surface means.

21. An arrangement of a plurality of storage racks for the storage of recordings and the like, each of said storage racks comprising mounting means, said mounting means comprising elongated body means having opposed upper and lower relatively long body side edges and opposed first and second relatively short body end edges, said elongated body means further comprising opposed relatively rearwardly and forwardly situated surface means, wherein said forwardly situated surface means extends for at least most of the distance between said upper and lower relatively long body side edges and extends for at least most of the distance between said first and second relatively short body end edges, relatively upper disposed upper support means carried by said mounting means, wherein said upper support means comprises a first U-shaped member of a generally U-shaped configuration having a first bight portion joining spaced first and second legs, first journal means carried by said elongated body means and situated at said first relatively short body edge generally between said rearwardly and forwardly situated surface means, second journal means carried by said elongated body means and situated at said second relatively short body edge generally between said rearwardly and forwardly situated surface means, wherein said first leg comprises a first pivot portion connected to said first journal means, wherein said second leg comprises a second pivot portion connected to said second journal means, wherein with said first and second pivot portions being connected to said first and second journal means said first bight portion is situated forwardly of said forwardly situated surface means, relatively lower disposed lower support means carried by said mounting means, wherein said lower support means comprises a second U-shaped member of a generally U-shaped configuration having a second bight portion joining spaced third and fourth legs, wherein said third and fourth legs are connected to said elongated body means as to maintain said second bight portion in a fixed position relative to said elongated body means, wherein when in said fixed position said second bight portion is situated relatively forwardly of said forwardly situated surface means, wherein said first U-shaped member is pivotally swingable about said first and second journal means, wherein said first and second legs are each of a length whereby said first U-shaped member is pivotally swingable upwardly to an upper-most position whereat said first bight portion attains an elevation substantially above the elevation of said upper relatively long body side edge, wherein said first and second legs are each of a length whereby when said first U-shaped member is pivotally swung from said upper-most position and toward a lower-most position forwardly of said forwardly situated surface means said first bight portion traverses a position which is disposed forwardly of said forwardly situated surface means a distance substantially greater than the distance by which said second bight portion is disposed forwardly of said forwardly situated surface means, wherein said second bight portion is effective for providing generally upward support to such recordings and the like as are placed thereatop, wherein when said first U-shaped member pivotally swings downwardly and forwardly of said forwardly situated surface means said lower-most position is determined by the engagement of said first bight portion with at least certain of such recordings and the like as are placed atop said second bight portion thereby having said first bight portion form a gate-like retainer generally containing said recordings and the like as are placed atop said second bight portion between said first bight portion and said forwardly situated surface means and maintaining said recordings and the like atop said second bight portion, wherein said first U-shaped member is also positionable as to cause said first bight portion to be disposed generally rearwardly of said relatively rearwardly situated surface means, and position holding means, said position holding means serving to hold said first U-shaped member in a selected position extending generally rearwardly of said relatively rearwardly situated surface means to thereby result in said first bight portion serving as stand-like portion for vertically supporting said elongated body means upon associated support surface means, and connecting means operatively connecting said first U-shaped member of a relatively forwardly situated one of said plurality of storage racks to the elongated body means of a relatively rearwardly situated next adjacent one of said plurality of storage racks.

22. An arrangement according to claim 21 wherein said connecting means is connected to said first bight portion of said first U-shaped member of a forwardly situated one of said storage racks.

23. An arrangement according to claim 21 wherein said connecting means comprises intermediate support means situated between said lower relatively long body side edge of said relatively rearwardly situated next adjacent storage rack and said associated support surface means to thereby generally vertically support said lower relatively long body side edge atop said associated support surface means, and mechanical retainer means engaging said first bight portion of said first U-shaped member of said relatively forwardly situated storage rack and fixedly connected to said intermediate support means.

24. An arrangement according to claim 23 wherein said intermediate support means is separable from said elongated body means of said relatively rearwardly situated next adjacent storage rack, and wherein said intermediate support means comprises cradle-like surface means for receiving therein at least a portion of said lower relatively long body side edge of said relatively rearwardly situated next adjacent storage rack.

25. An arrangement according to claim 24 wherein said mechanical retainer means comprises at least one clip-like member comprising a journal-like portion, and wherein said journal-like portion generally circumscribes said first bight portion of said first U-shaped member of said relatively forwardly situated storage rack.

* * * * *

UNITED STATES PATENT AND TRADEMARK OFFICE
CERTIFICATE OF CORRECTION

PATENT NO. : 4,967,915
DATED : November 6, 1990
INVENTOR(S) : Jerry A. Robson

It is certified that error appears in the above-identified patent and that said Letters Patent is hereby corrected as shown below:

Column 12, line 60, after "means" change "1" to ---- 14 ----.

Column 25, line 21 (Claim 1, line 9 thereof), cancel "tee" and substitute therefor ---- the ----.

Signed and Sealed this

Sixth Day of July, 1993

Attest:

MICHAEL K. KIRK

*Attesting Officer*   Acting Commissioner of Patents and Trademarks